Oct. 14, 1969  E. M. RIBLER  3,472,287
CONTROL DEVICE FOR TEXTILE MACHINES
Filed Oct. 31, 1966  25 Sheets-Sheet 1
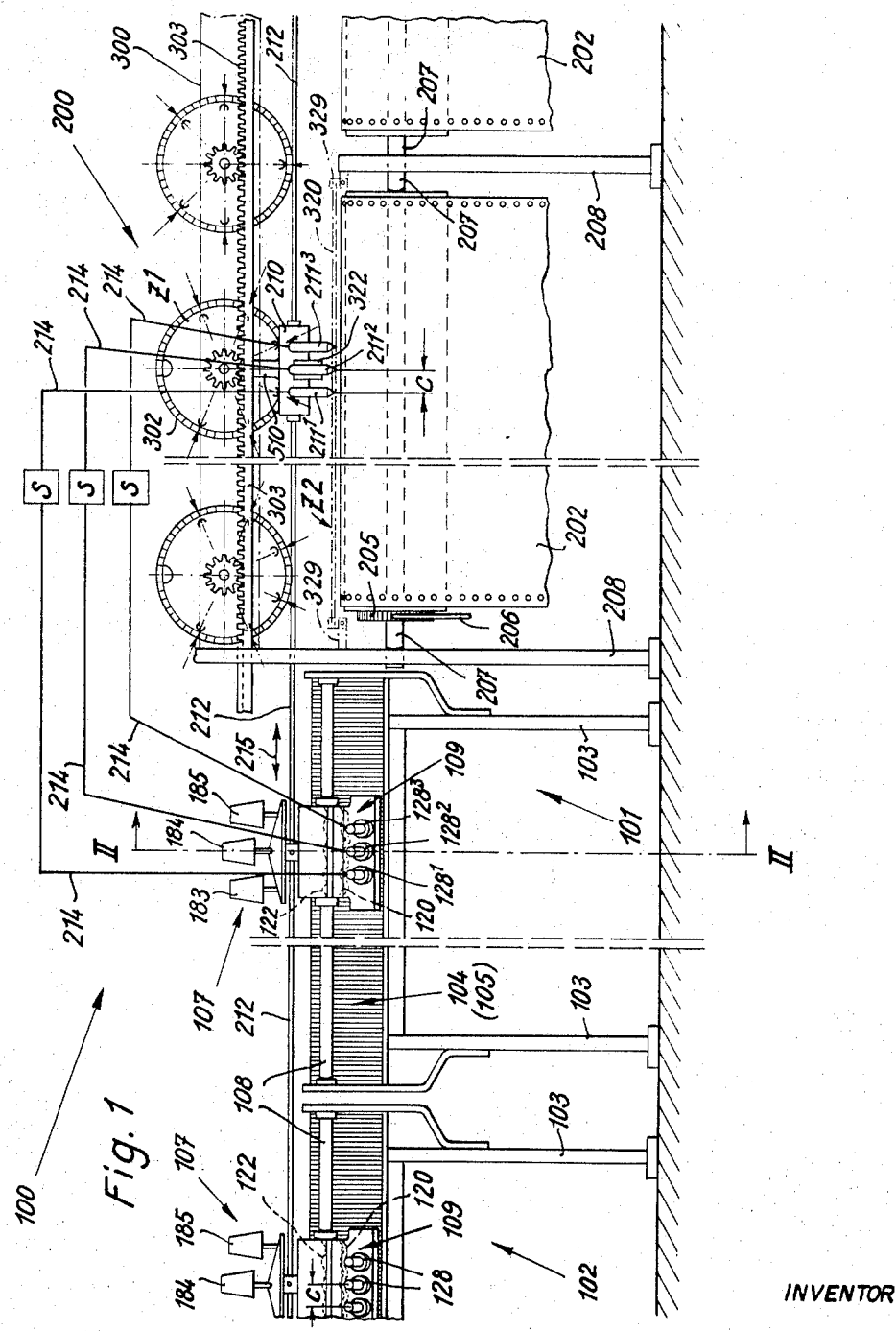
INVENTOR
Erich M. Ribler
BY Otto John Munz
ATTORNEY

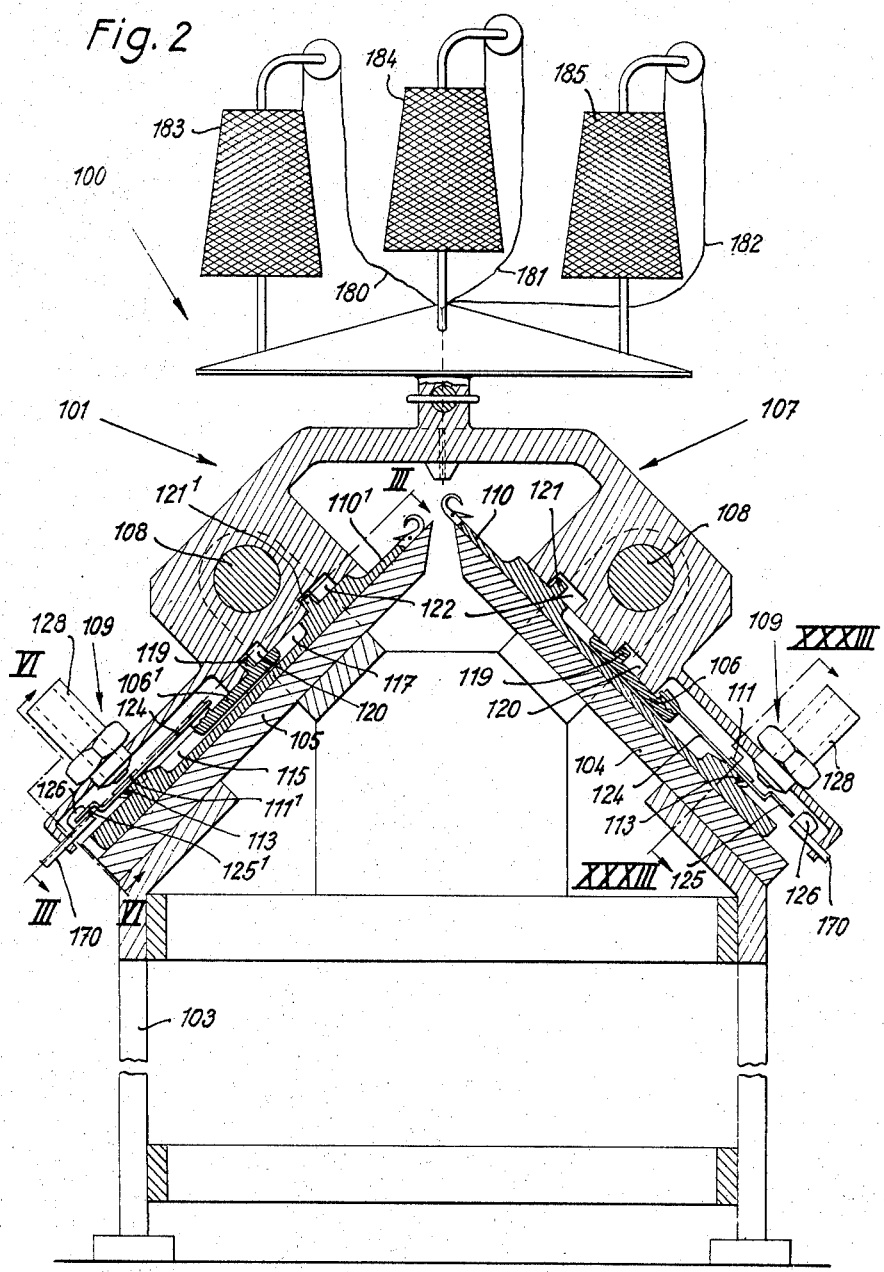

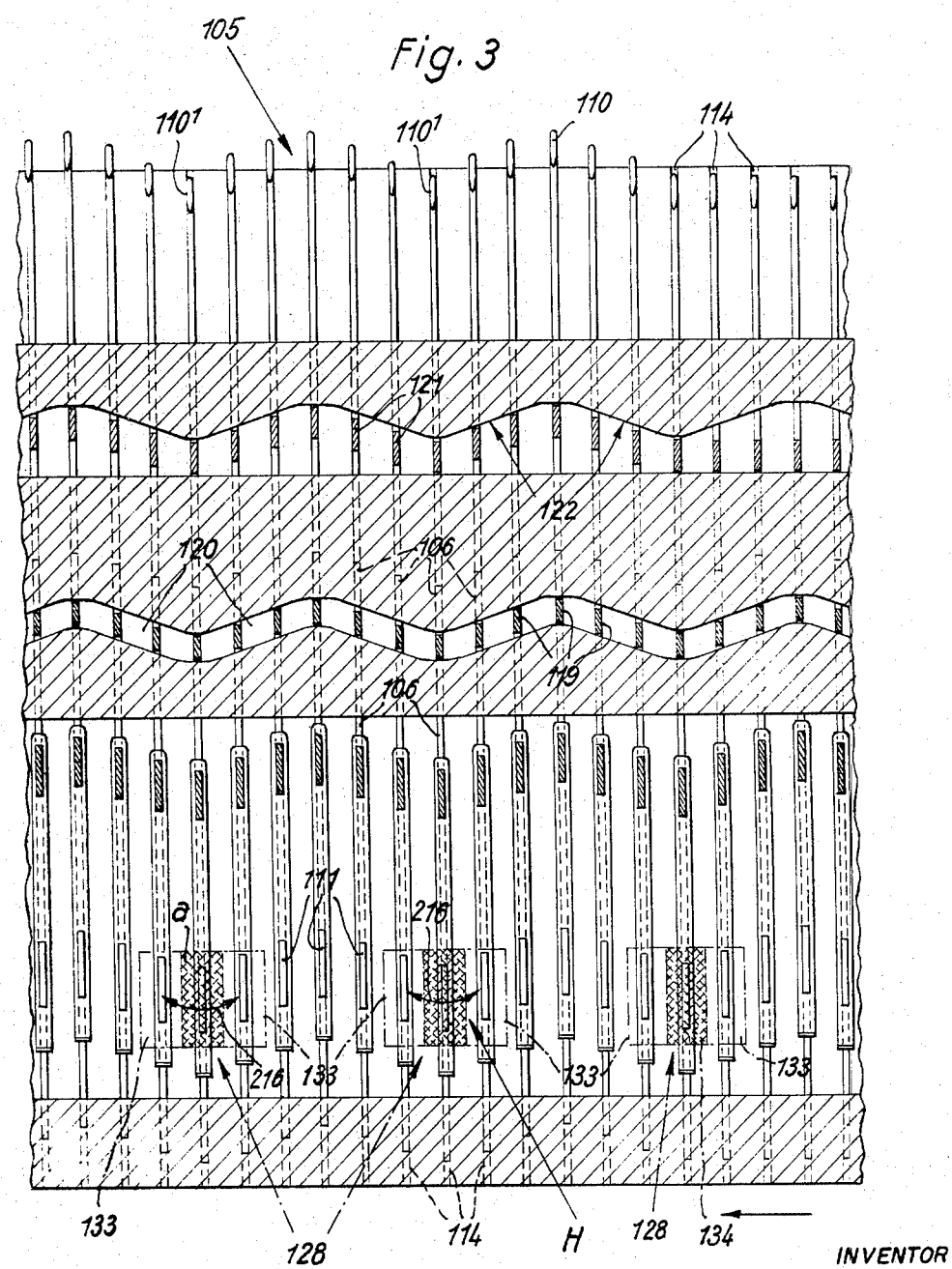

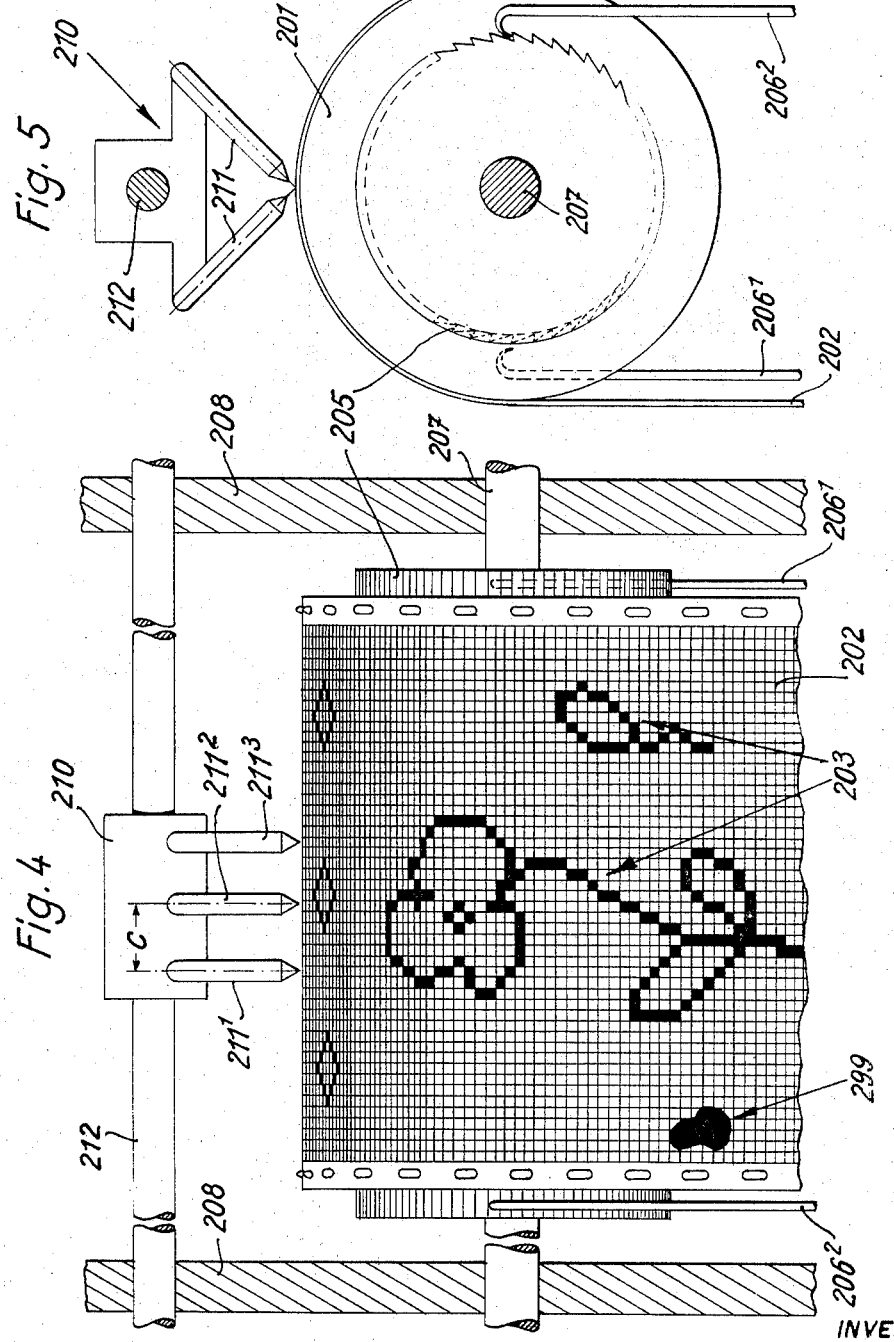

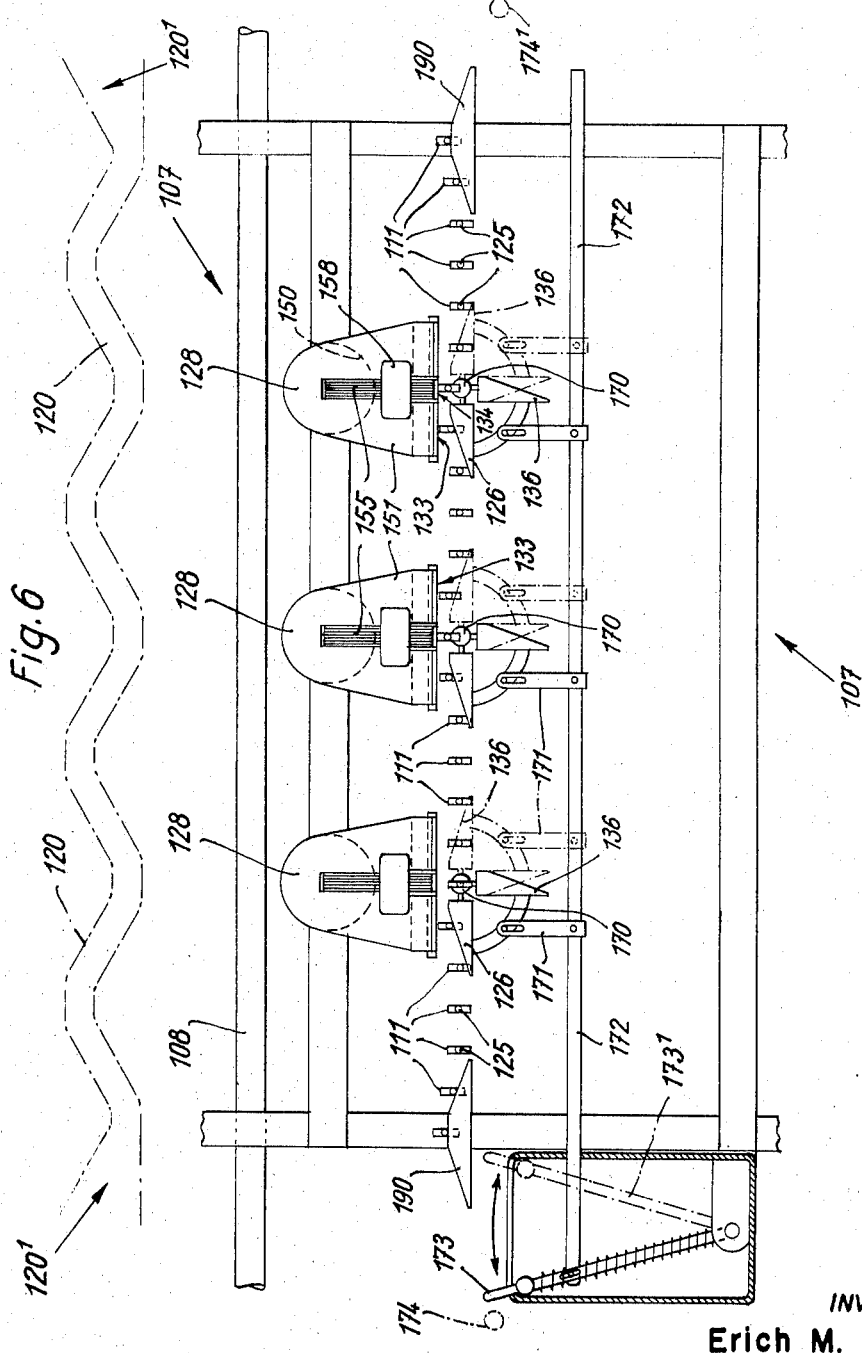

Oct. 14, 1969          E. M. RIBLER          3,472,287
CONTROL DEVICE FOR TEXTILE MACHINES
Filed Oct. 31, 1966                    25 Sheets-Sheet 6
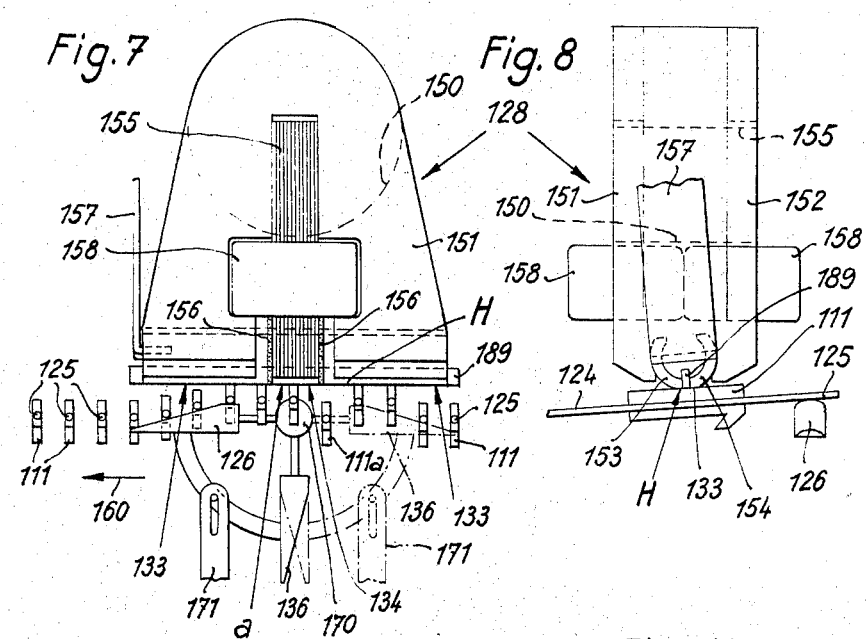
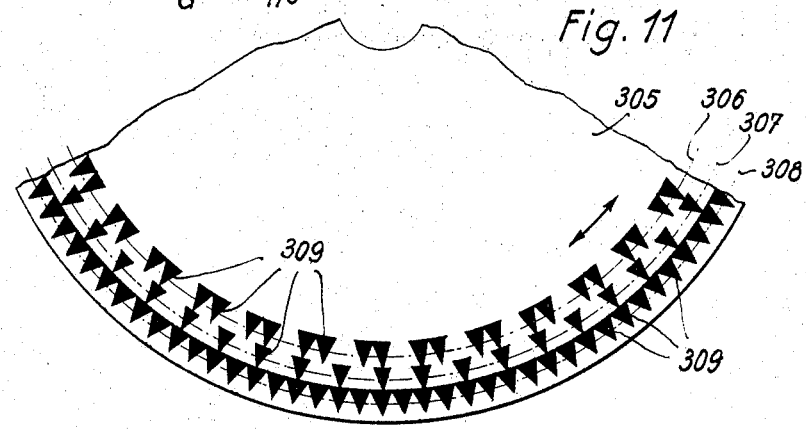
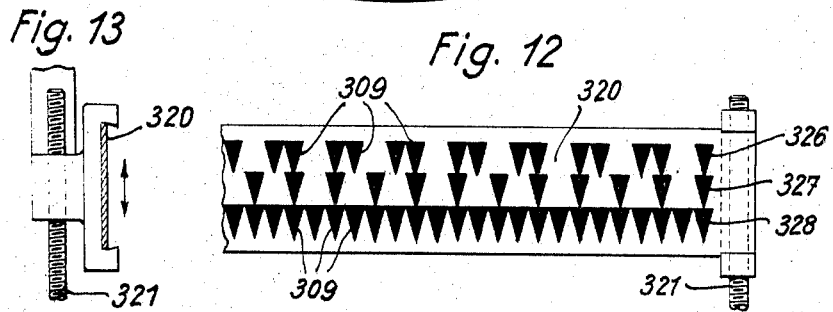
INVENTOR
Erich M. Ribler
BY Otto John Munz
ATTORNEY

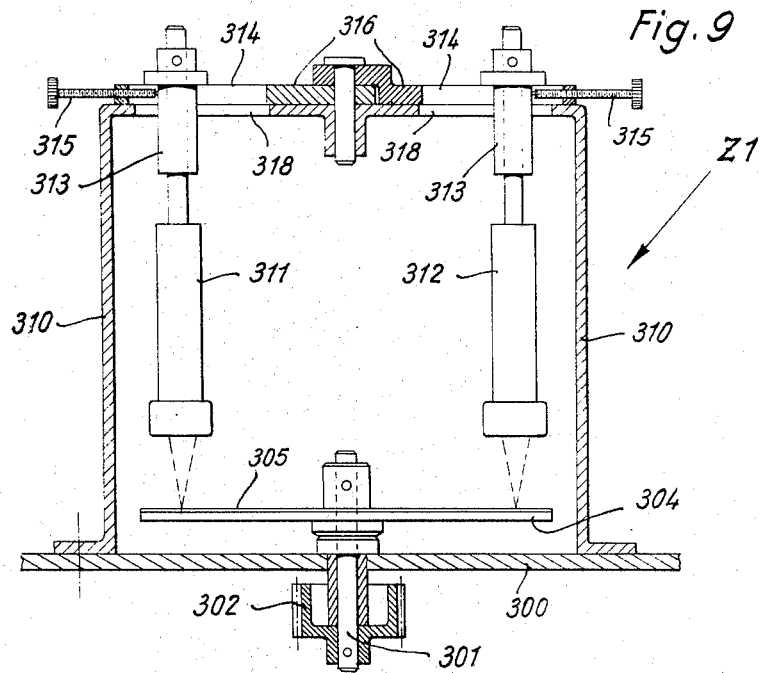
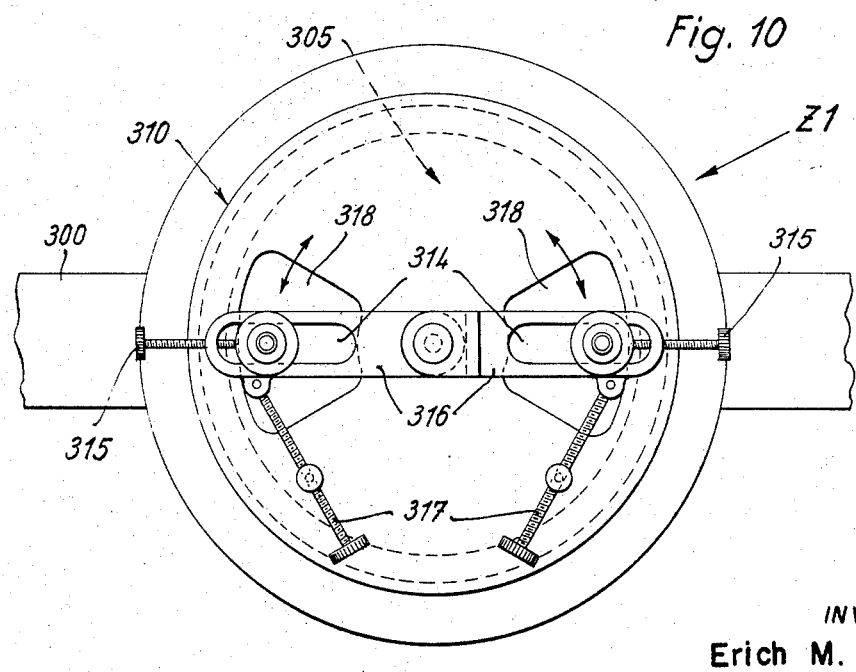

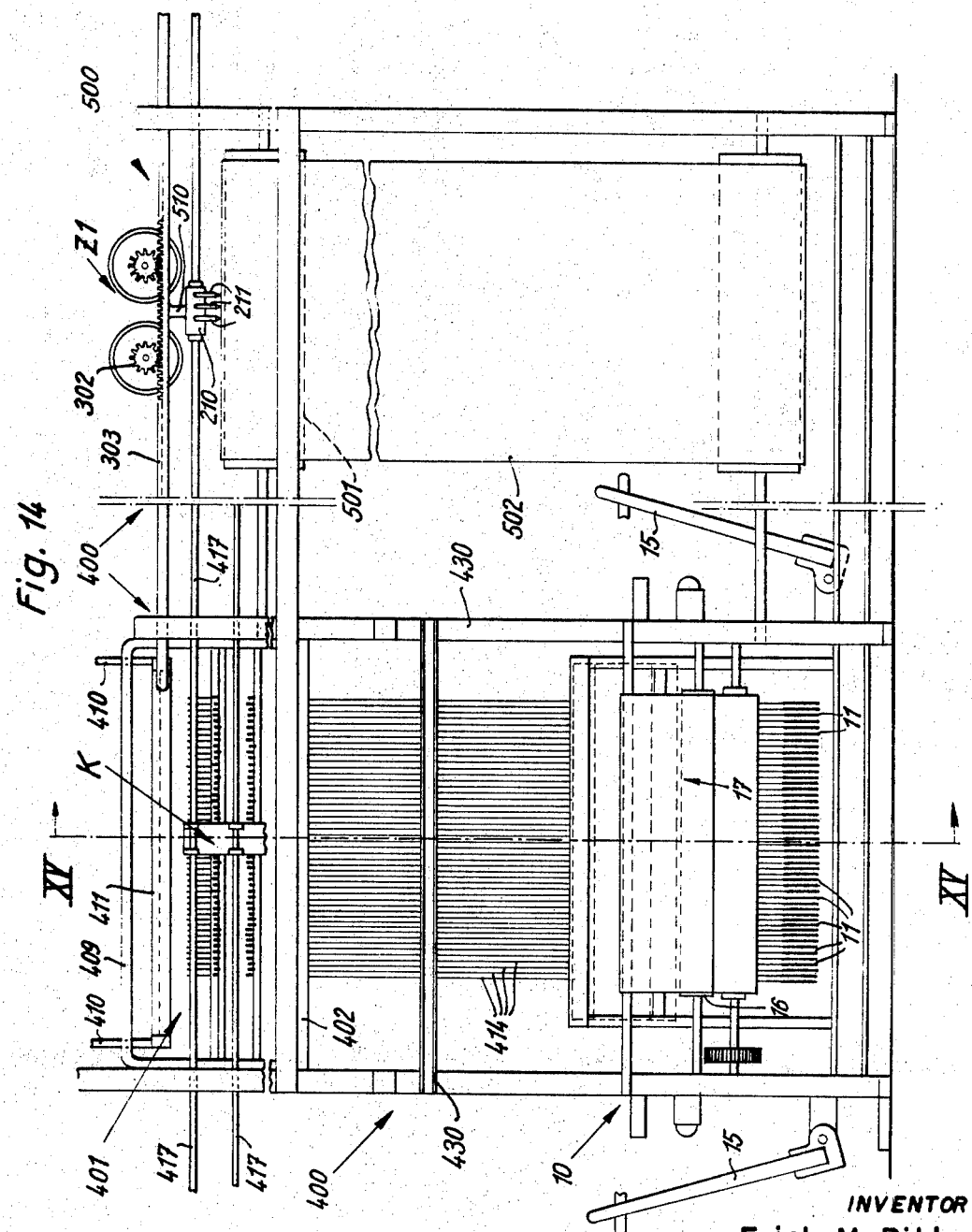

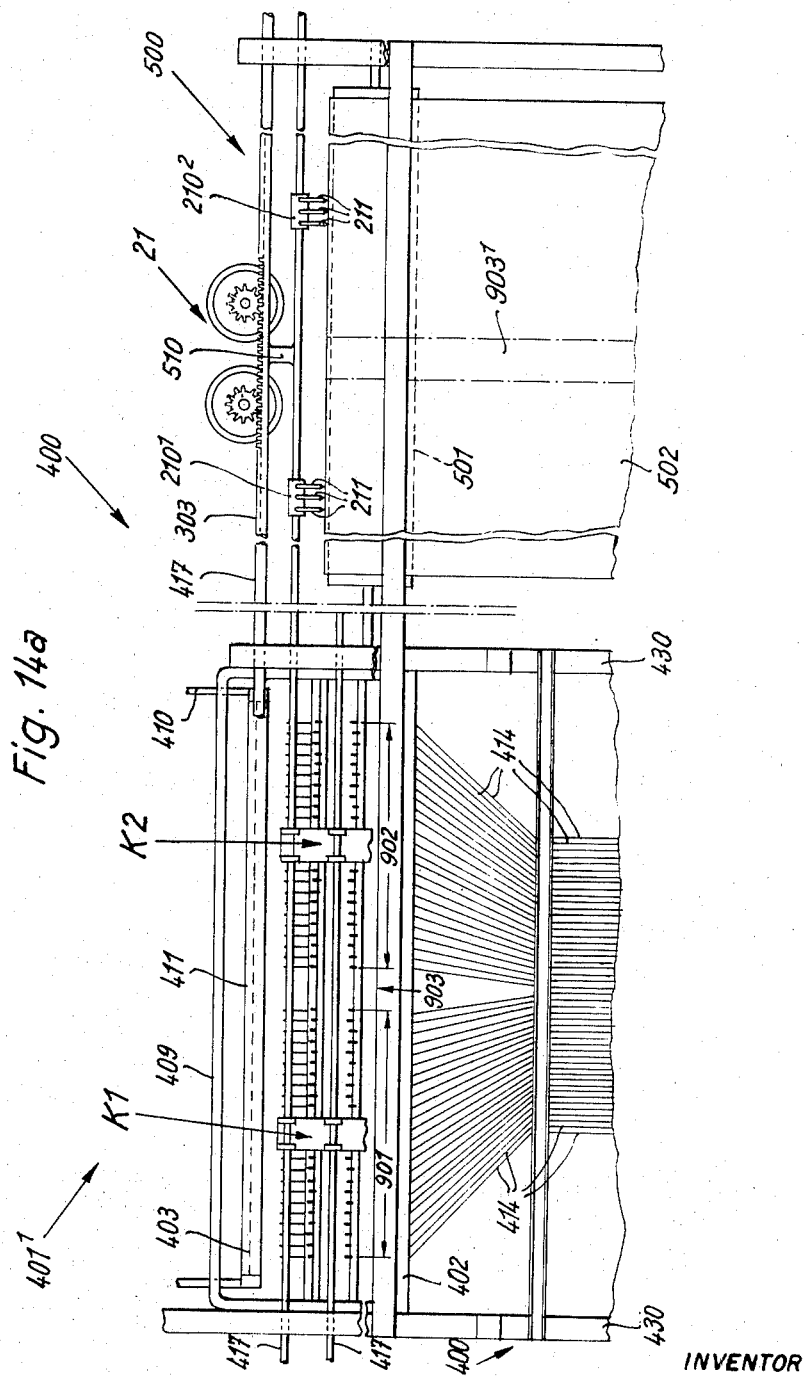

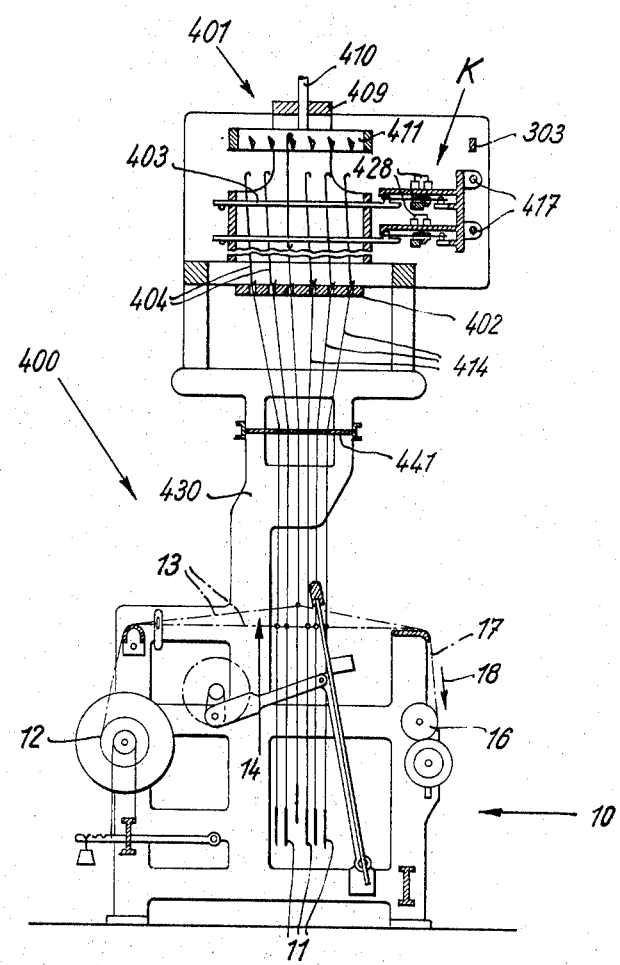

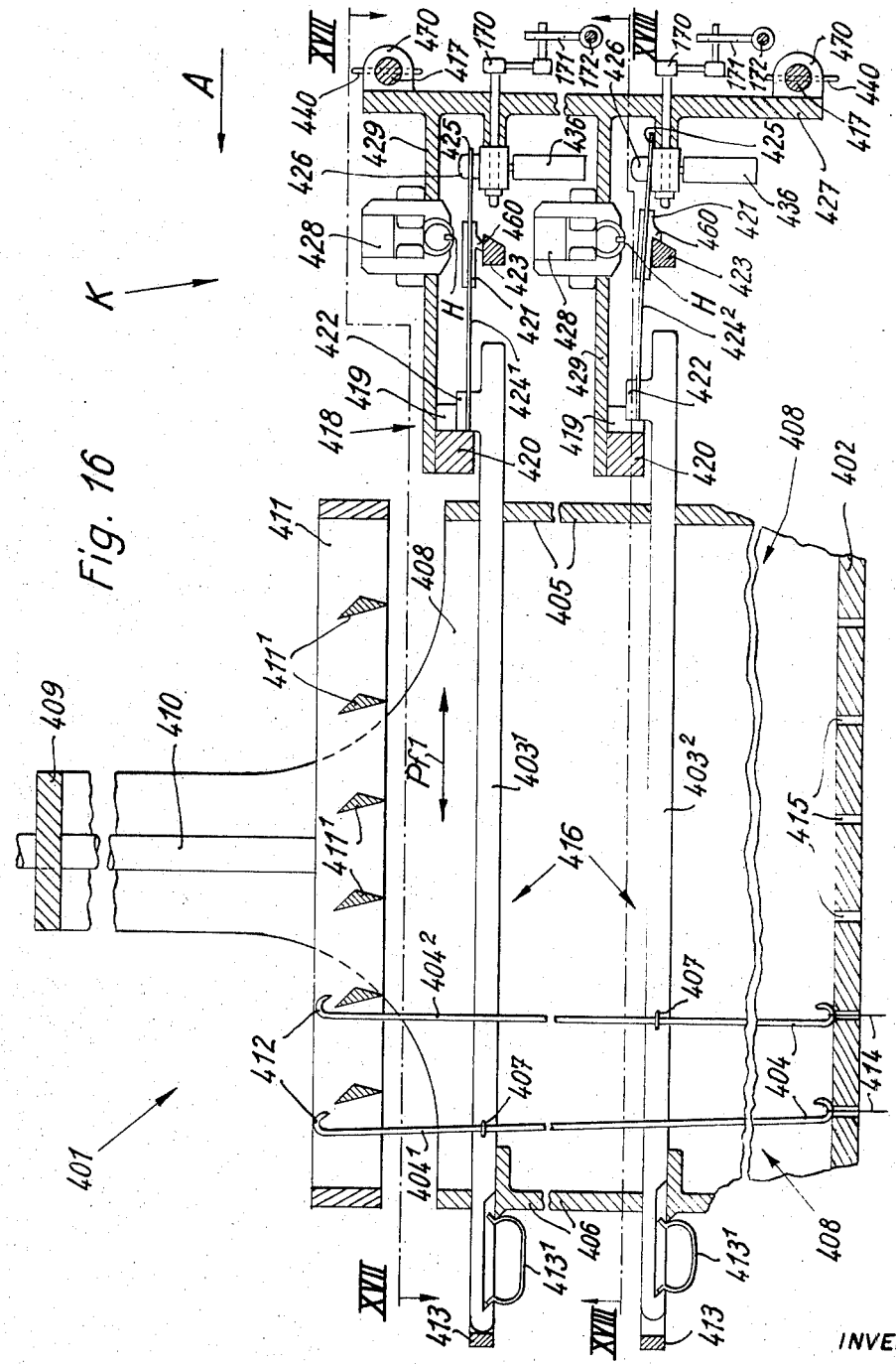

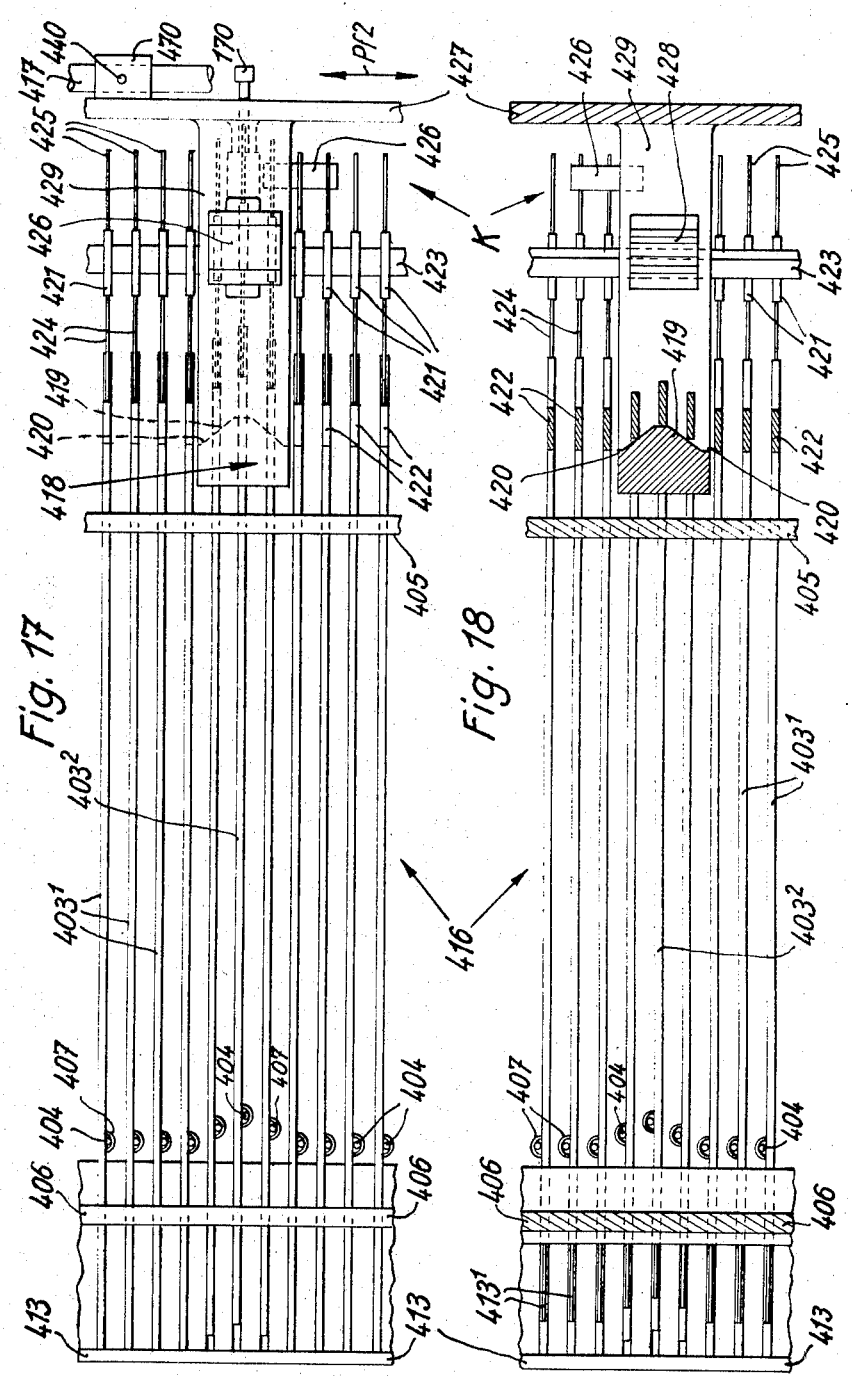

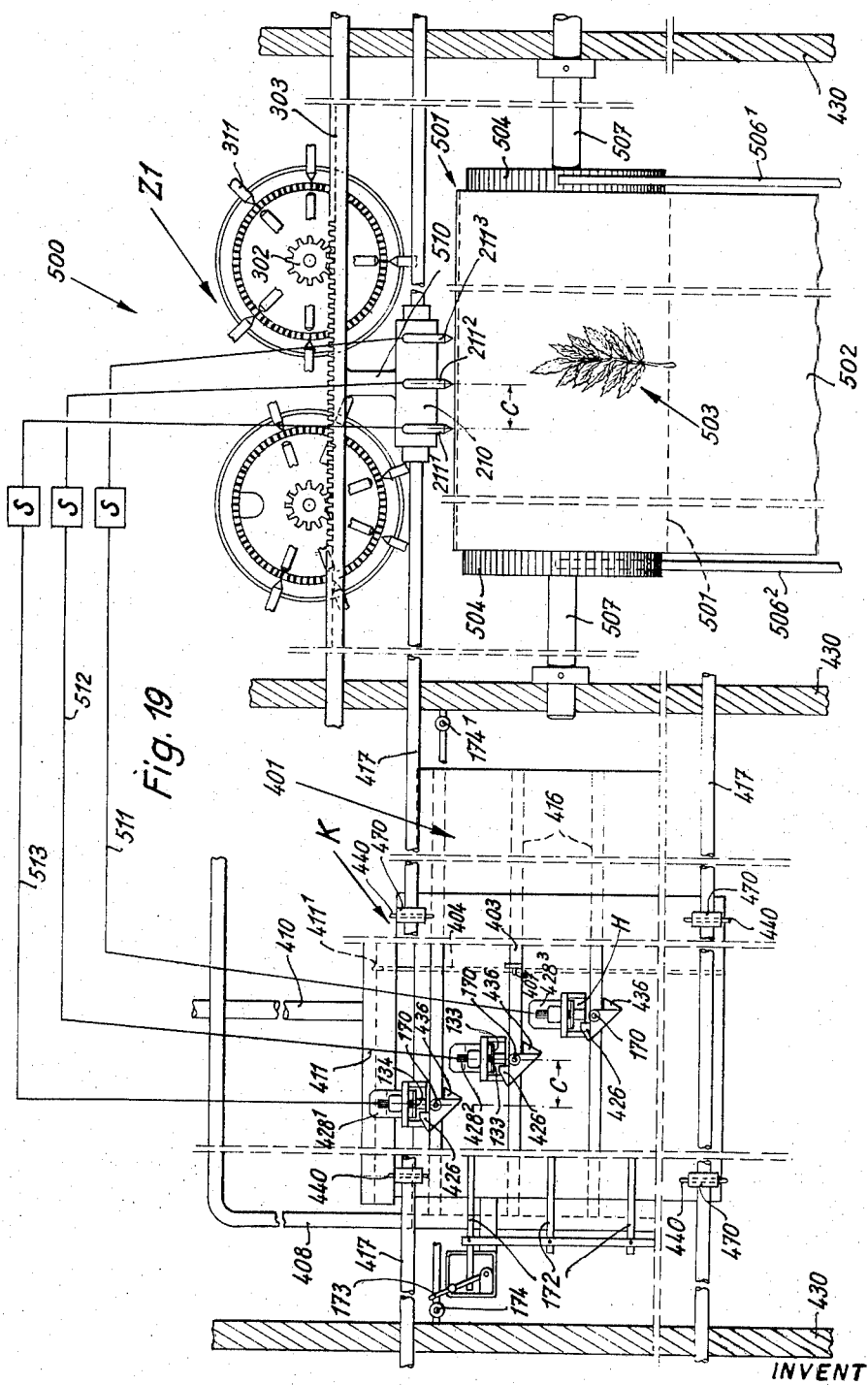

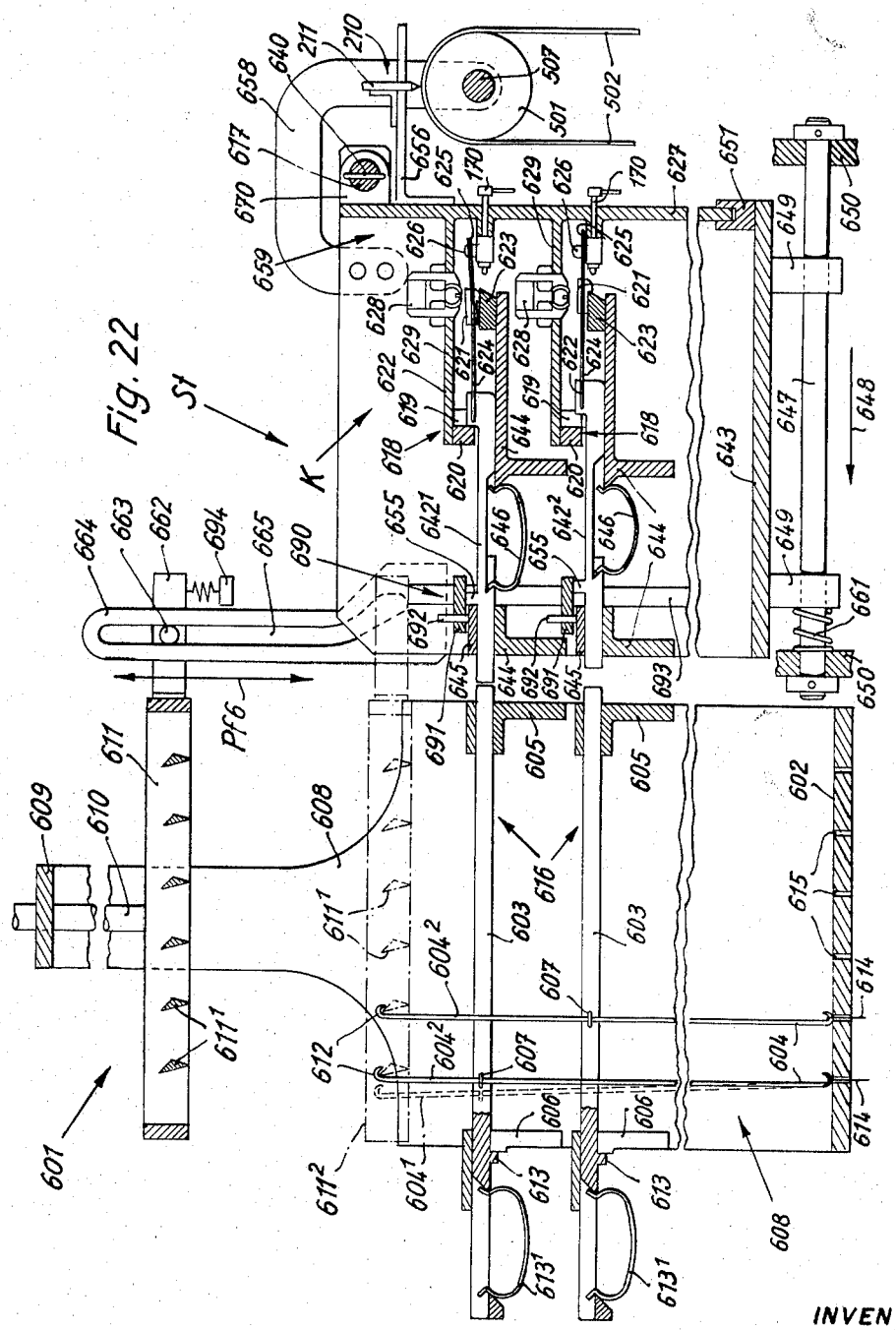

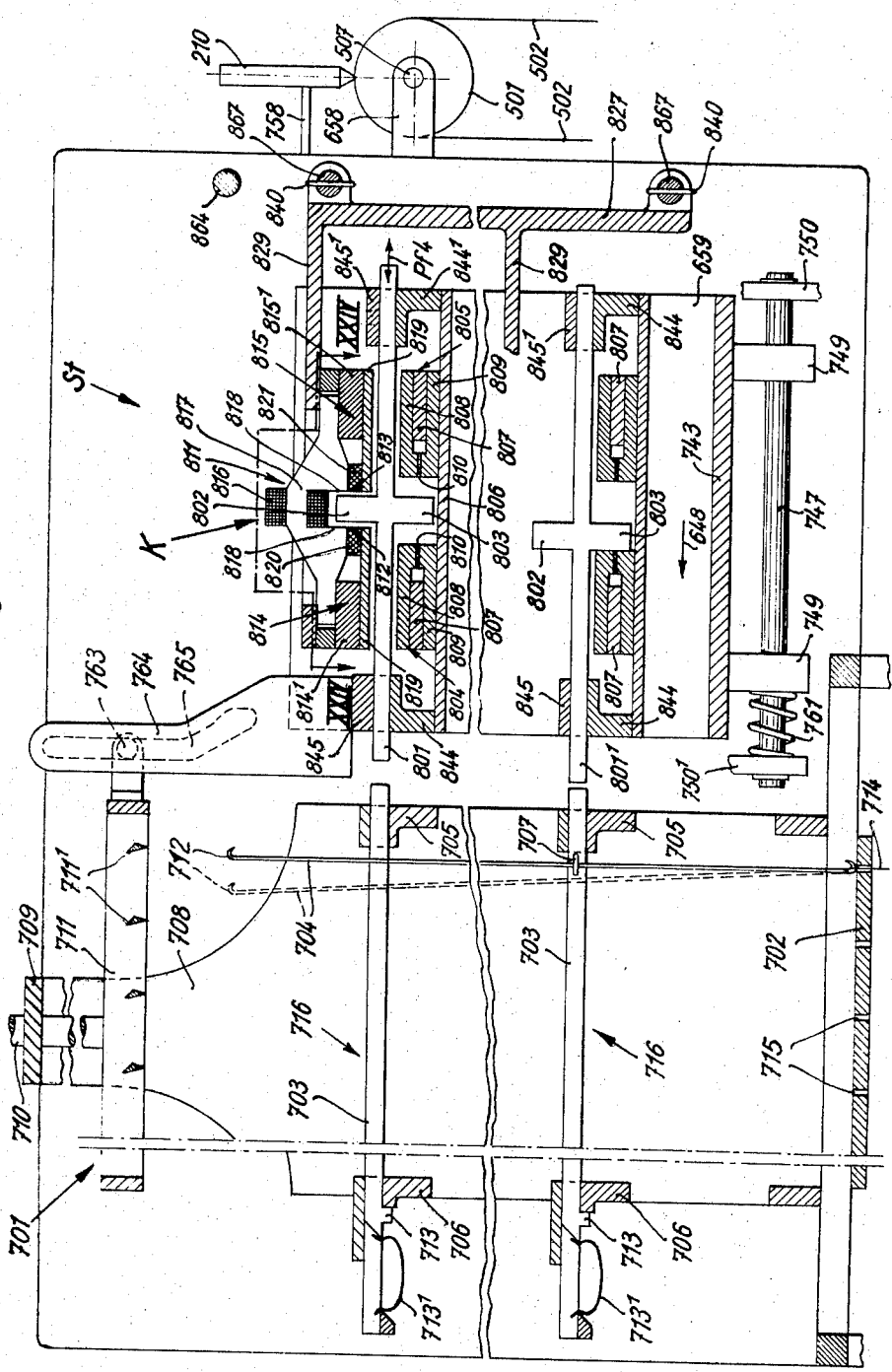

Oct. 14, 1969  E. M. RIBLER  3,472,287
CONTROL DEVICE FOR TEXTILE MACHINES
Filed Oct. 31, 1966  25 Sheets-Sheet 18
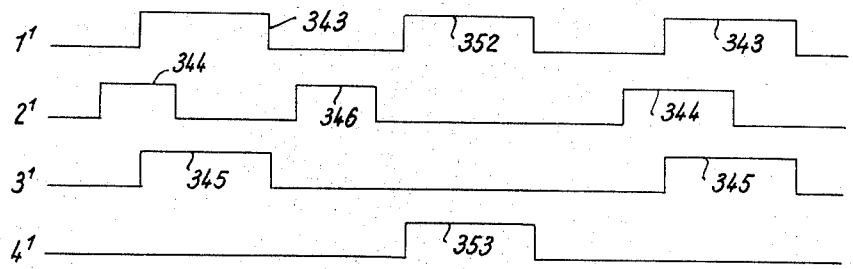
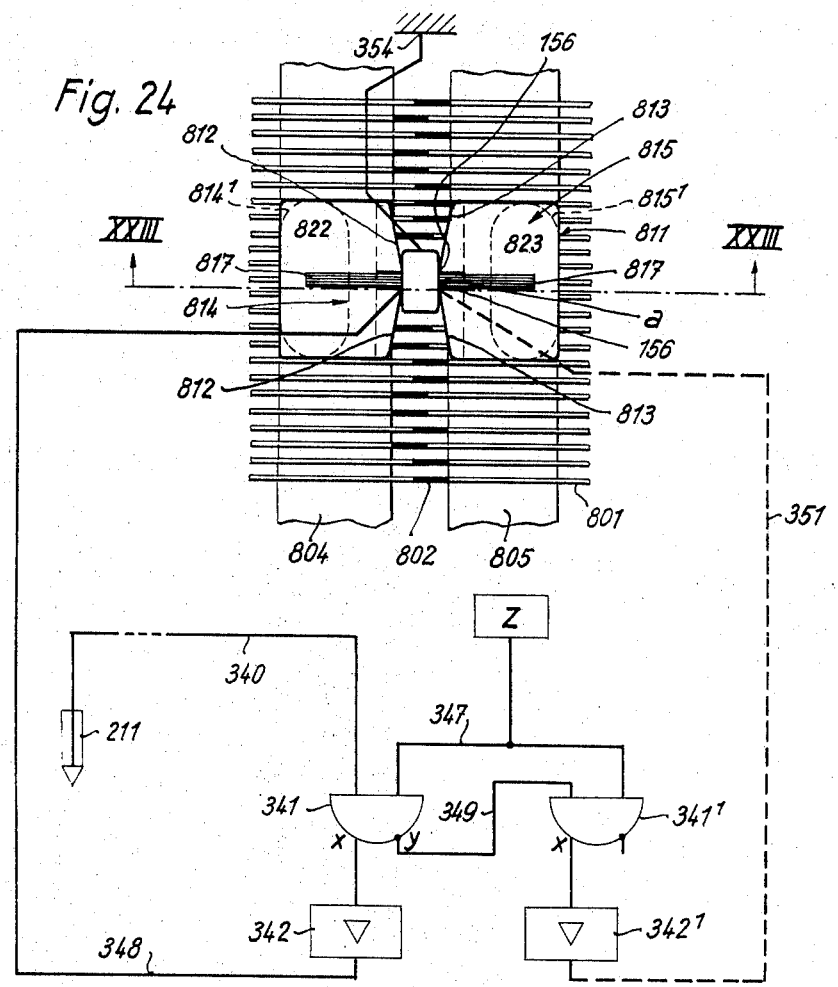
INVENTOR
Erich M. Ribler
BY  *Otto John Munz*
ATTORNEY Oct. 14, 1969 E. M. RIBLER 3,472,287
CONTROL DEVICE FOR TEXTILE MACHINES
Filed Oct. 31, 1966 25 Sheets-Sheet 19
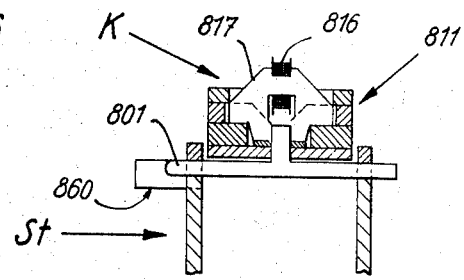
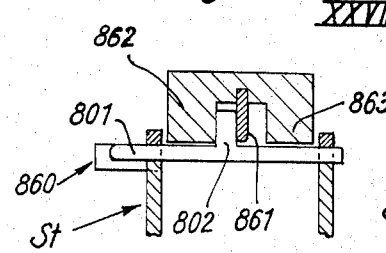
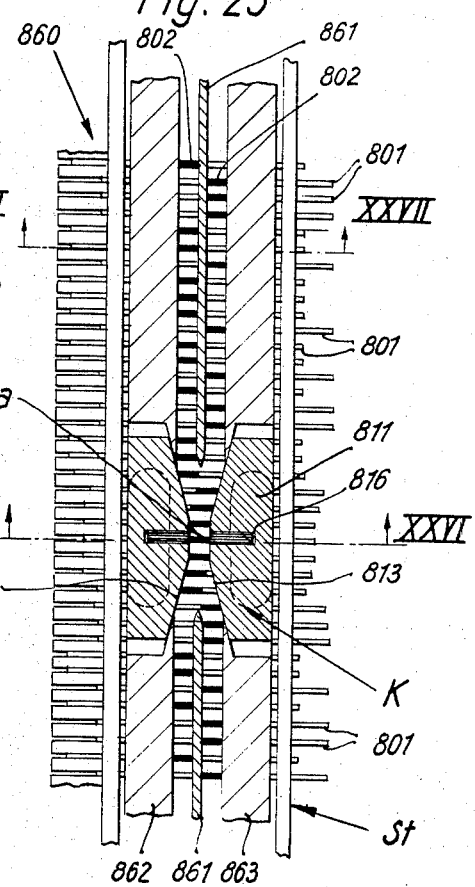
INVENTOR
Erich M. Ribler
BY
ATTORNEY Oct. 14, 1969　　　　　　　E. M. RIBLER　　　　　　　3,472,287
CONTROL DEVICE FOR TEXTILE MACHINES
Filed Oct. 31, 1966　　　　　　　　　　　　　　25 Sheets-Sheet 20
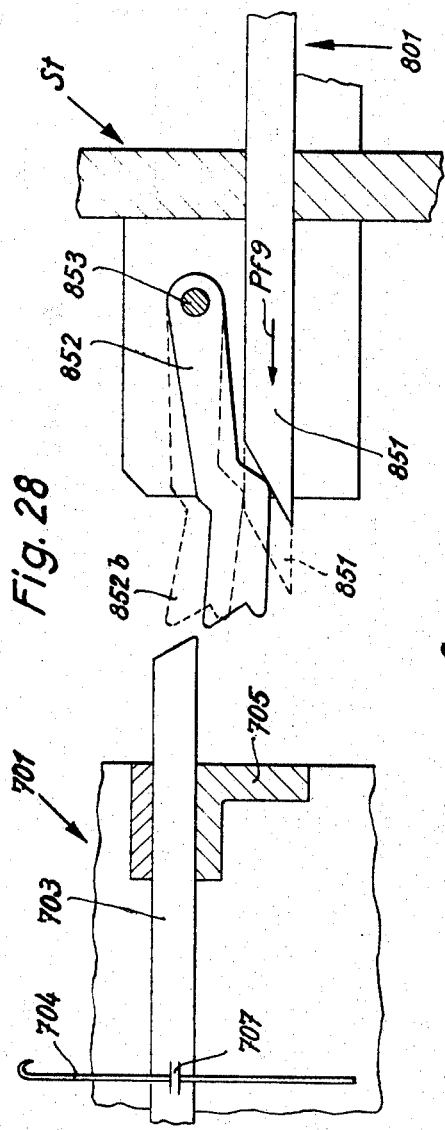
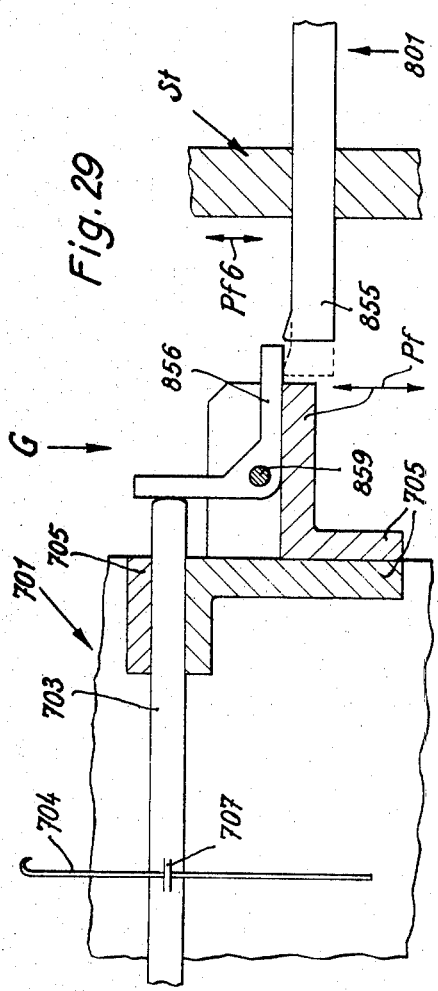
INVENTOR
Erich M. Ribler
BY Otto John Munz
ATTORNEY

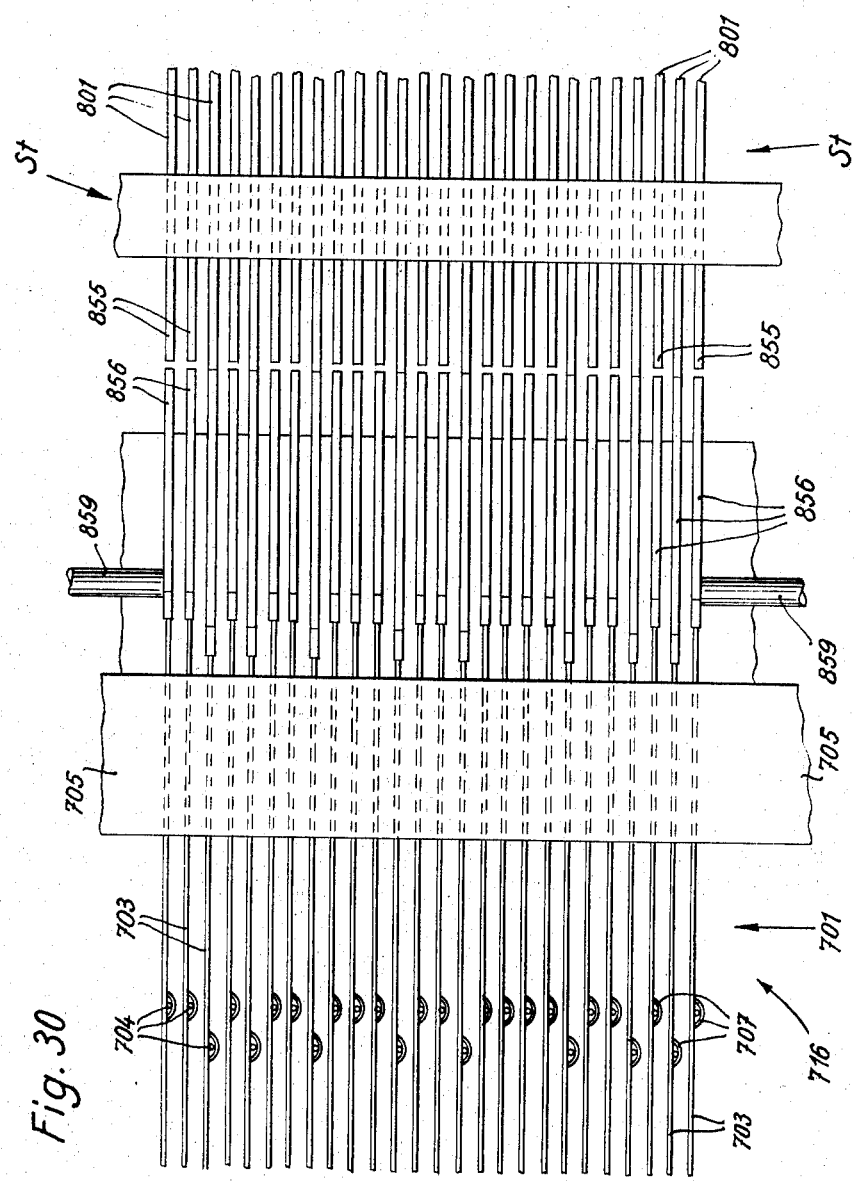

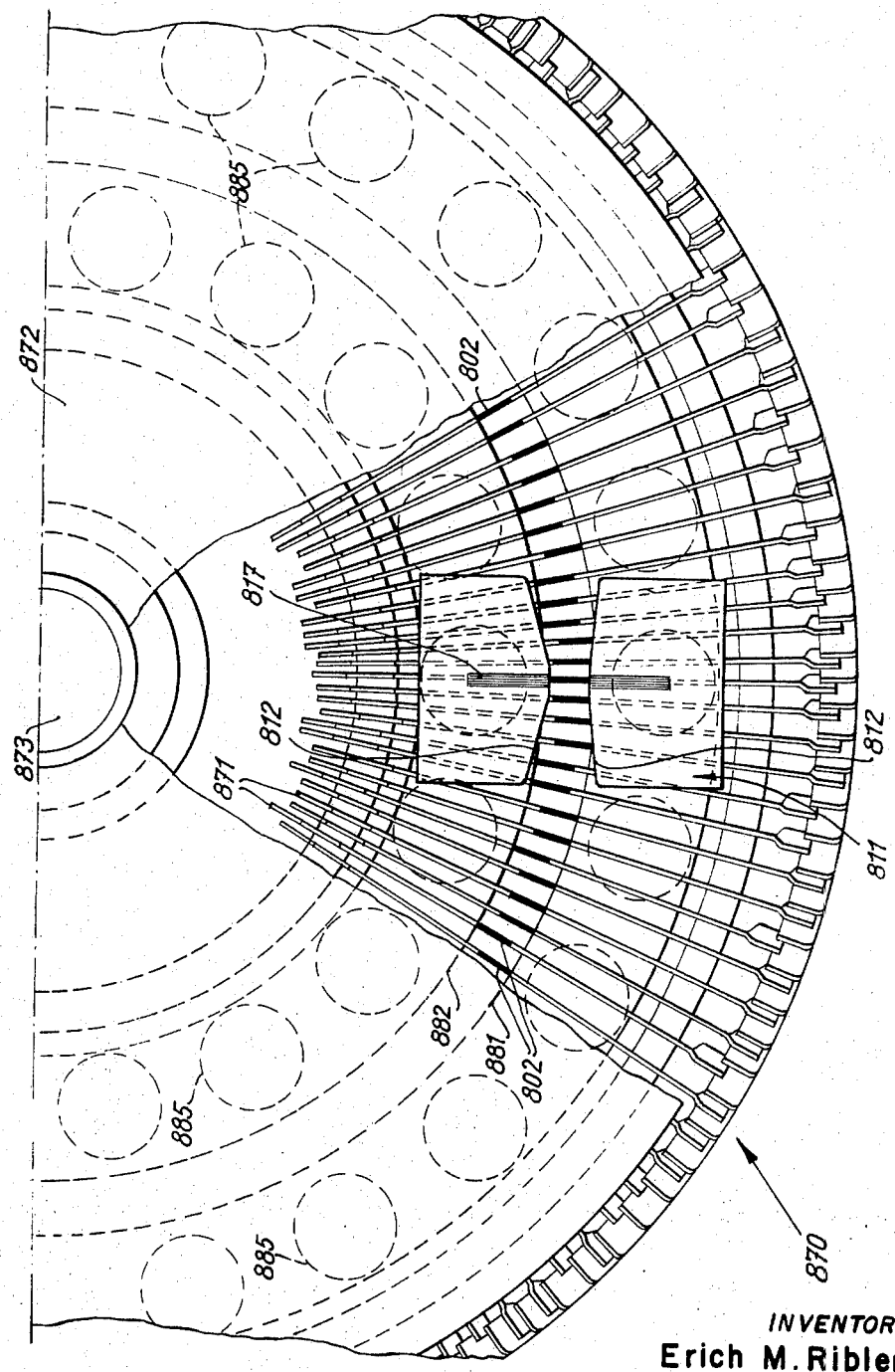

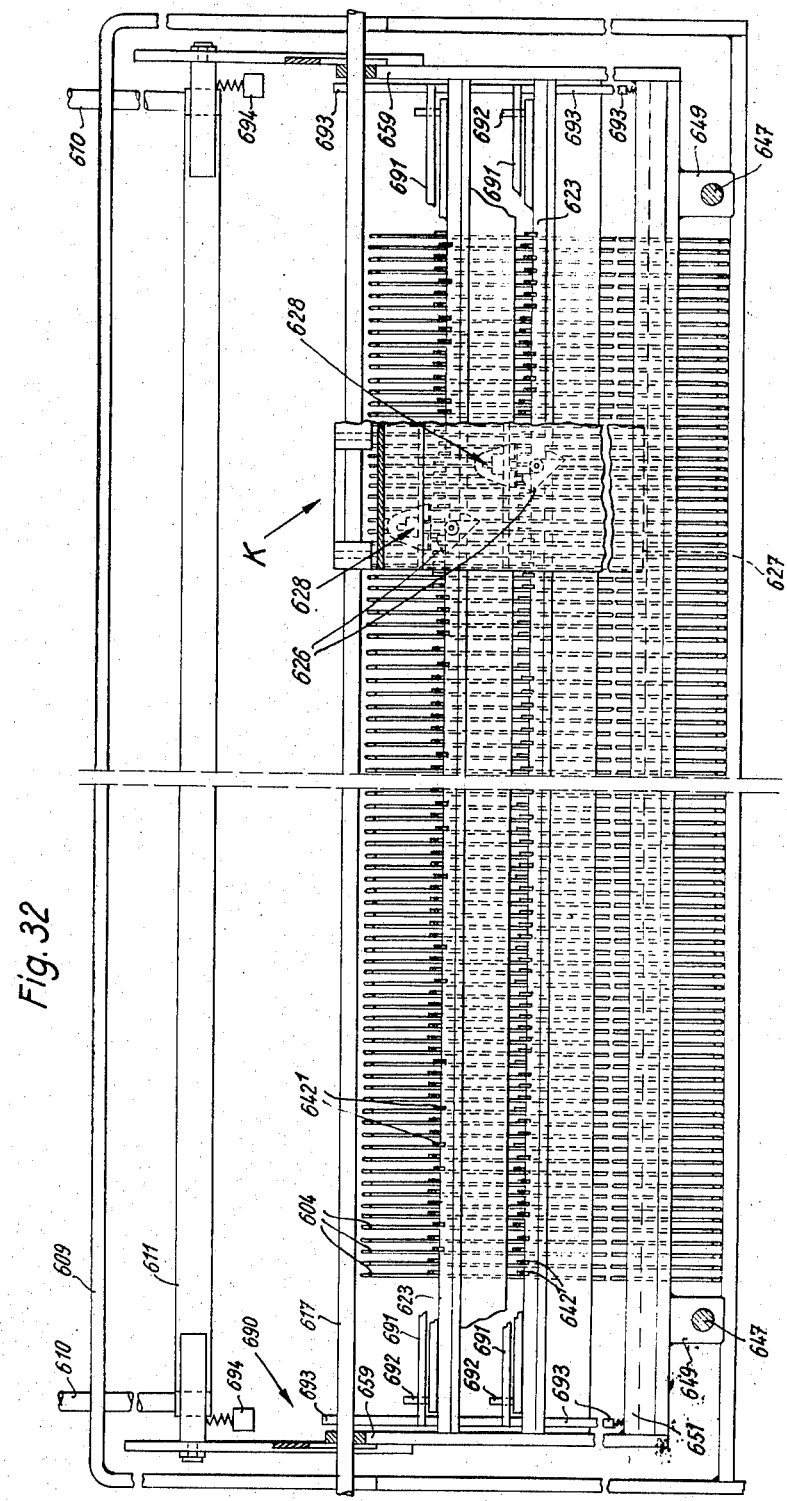

INVENTOR
Erich M. Ribler

United States Patent Office 3,472,287
Patented Oct. 14, 1969

3,472,287
CONTROL DEVICE FOR TEXTILE MACHINES
Erich Mathias Ribler, Kenzingen, Baden, Germany, assignor to Franz Morat, Freiburg im Breisgan, Germany
Filed Oct. 31, 1966, Ser. No. 590,673
Claims priority, application Germany, Oct. 29, 1965, M 67,097
Int. Cl. D03d 49/00; D03j 1/00; D04b 15/66
U.S. Cl. 139—319
15 Claims

ABSTRACT OF THE DISCLOSURE

The warp threads of a loom are selectively lifted by harness cords 714, if their sinkers 704 are in positions such that sinker lugs 712 catch on the blades 711' of an upwardly moving blade box 711. The positions of the sinkers 704 are determined by the selection of control elements 801 into either of two separated equilibrium positions. For every sinker there is a control element 801. The control elements 801 are arranged in rows. A magnetic setting means 811 moves along a row and pushes the control elements 801 into central positions between the equilibrium positions. While in central position, the control elements 801 are electromagnetically biased by the setting means 811 toward one of the two equilibrium positions. Further movement of the magnetic setting means 811 along the row pulls the control elements 801 into their selected equilibrium positions.

---

The present invention relates to a control device for textile machines, such as knitting, stitching, double-rib weaving, or weaving machines. The control device has a control magnet belonging to a preferably reciprocating control head. The device is actuated in a rapid succession of pulses, for example via electro-optical scanning means which scan a picture of a pattern to be produced. The device includes a plurality of coupling members, arranged side-by-side, which execute a selective movement.

For the production of complicated weaving patterns, so-called "jacquard machines" have been used for a long time. In these machines, the warp thread and, in other cases, the shuttle, are controlled by punched cards (jacquard cards). The production of such cards is very expensive. Furthermore, they retain no optical similarity to the product to be manufactured, so that corrections are cumbersome.

Electrically controlled textile machines are conventional. However, these machines operate comparatively slowly, or they are extraordinarily expensive and susceptible to breakdown, or they require specially prepared picture patterns.

It is furthermore already known to scan electro-optically pictures of patterns of the product to be manufactured, and to use the scanning pulses for electrically controlling the textile machines. However, in these textile machines, the thread-working members to be controlled and moved, such as knitting needles, sinkers, or the like cannot be moved as rapidly as is inherently possible with an electro-optical scanner.

Therefore, an object of this invention consists in providing that the rapid scanning sequence made possible by employing electro-optical scanners—if desired, also storage devices—can be converted with as high a speed as possible into rapid mechanical movements of the thread-working members such as needles, sinkers, or like parts of textile machines. Furthermore, the device of the invention is to make possible, additionally, a comparatively rapid control of textile machines even if only an unprepared pattern of the article to be produced is available, or a pattern which was prepared only in an inexpensive manner.

The solution of the above-mentioned objects resides, according to the invention, essentially in the fact that the control device is provided with a control head having at least one control magnet or a magnetically operative member for the control elements. This control head is displaceable at right angles with respect to the control elements. The control magnet, or the operative member, has at least one track provided with a selecting zone, and the control head has at least one feeding means moving control elements into the region of the track and its selection zone. Furthermore, a drive means is provided for the selected control elements linked to selected thread-working members.

Preferably, the track of the control magnet is formed by a permanent magnet which attracts, in sliding adherance magnetizable portions of the control elements proximate thereto. It is possible to connect these control elements to a drive means of the control device.

By these measures, it is achieved that the control elements or coupling members are moved mechanically, and comparatively slowly, to the selecting zone of the control magnet, where they execute, in cases where their selection is required, only a comparatively brief, rapid control movement to couple with their thread-working members, whereupon a sufficiently strong mechanical drive means can accomplish the movement of the thread-working members, the knitting needles, sinkers, or like parts of the textile machine.

The proposed measures can be employed, by constructing the operating head accordingly, in various textile machines, such as, for example, in knitting, stitching, and double-rib looms, and also in the weaving art, in connection with jacquard machines or looms controlled along the lines of the jacquard principle.

A particularly favorable construction of the control device is obtained by providing in the control elements, at the terminal points of their displacement paths, position-stable abutment points, and by providing the operative member or members effective as control elements of the control head with two guide tracks for magnetizable control lugs (tappets, projections, lips) of control elements; these guide tracks at first converge—as seen in the respective conveying (travel) direction—and guide in their selective zone, whereas they diverge again—as seen in the respective direction of travel—behind the selective zone up to at least the abutment points of the control elements. Within the selective zone, at least one electromagnet causes the respectively selected control element to contact one of the guide tracks, and maintains it thereat, in correspondence with the direction of current flow on the magnet coil presently ambient therein. By taking this measure, a particularly short selecting movement is attained, the masses to be moved, namely, the mass of the respective control element, also being kept relatively small.

If desired, it is also possible in the last-mentioned embodiment, to provide mechanical holding bars for the control lugs, so that the control elements are kept flush in the selected final position.

The control elements can be used as preliminary control needles of a jacquard-type control device and can be housed in a control box. This box can then move the transverse needles controlling the sinkers, by a shifting motion, after precontrol needles have been selected in accordance with the pattern.

In certain cases, it is advantageous to provide the control device with a time control element with whose aid the control pulses obtained by the electro-optical scanning means can be brought into line with the selecting zone of the control magnets, with respect to time and geometry. Thereby, it is made easy to correlate the selecting zone of a control magnet with the corresponding scanning point of an electro-optical scanner. Under certain circumstances, a raster-type configuration of the pattern can be avoided.

Further details of the invention will be explained in more detail with reference to the embodiments illustrated in the drawings. The drawings are of different scales.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGS. 1–13 show a knitting machine, to wit:

FIG. 1 illustrated the front view of a machine for knitting and stitching, including a scanning device positioend beside the machine and connected therewith.

FIG. 2 shows a vertical cross section through the knitting machine, particularly through the control head thereof, along the section line II—II in FIG. 1. The pivoting mechanism for the wedges shown in FIG. 6 is partially omitted in the present figure, for reasons of clarity.

FIG. 3 shows a section, parallel to the plane of motion of the needles, through the control head, according to the section line III—III in FIG. 2.

FIG. 4 shows an enlarged front view, partially in section, of a pattern located on a roller, above which a scanning head is arranged, as can be seen, on a different scale, in FIG. 1.

FIG. 5 is a lateral view, partially in section, of the drum and the belt carrying the pattern, according to FIG. 4.

Figure 20:
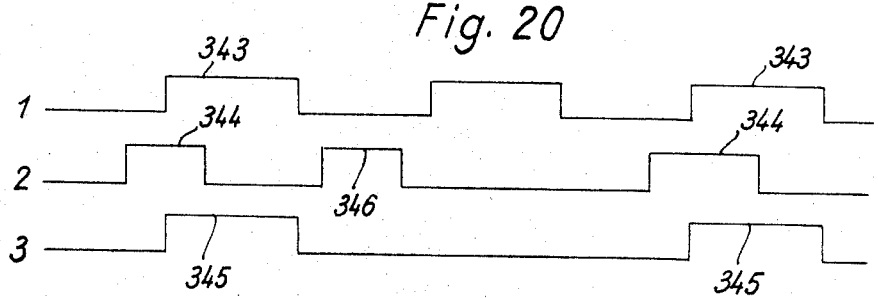

FIG. 6 is a schematic lateral view, partially in section, of the control magnets and the feed wedges, according to the line VI—VI in FIG. 2. In this connection, there is indicated in dot-dash lines, above the control magnets, the curved path of the drive rod of the control head, rotated by 90° into the plane of the drawing. Otherwise the parts of the needle bed of FIG. 2 are omitted for the sake of clarity.

FIG. 7 and FIG. 8 illustrate, on an enlarged scale, a plan view and a lateral view of a control magnet.

FIG. 9 shows a central longitudinal section through a cylindrical time control element.

FIG. 10 shows a plan view of the time control element according to FIG. 9.

FIG. 11 shows a plan view of a section of a circular control disk of the time control element according to FIGS. 9 and 10.

FIG. 12 shows a plan view of a part of a linear-type control disk belonging to a somewhat modified time control element, which is also indicated in FIG. 1; and FIG. 13 shows a vertical cross section through the control disk of FIG. 12.

In FIGS. 14–22, the invention is explained in greater detail with reference to a jacquard-type device.

FIG. 14 is a front view of a schematized jacquard machine having a control device according to the invention, including a scanning device located beside the machine and connected therewith.

FIG. 14a is a front view of a somewhat modified construction of FIG. 14.

FIG. 15 shows a jacquard machine along the section line XV—XV of FIG. 14, partially in section.

FIG. 16 shows a partial lateral view, in section, of a jacquard-type device according to FIG. 15.

FIG. 17 is a horizontal, partial cross section along the section line XVII—XVII in FIG. 16.

FIG. 18 is a horizontal, partial cross section according to the section line XVIII—XVIII in FIG. 16.

FIG. 19 is a front view, partially in section, of the jacquard portion and the scanning device of the apparatus according to FIGS. 16–18, as seen in the direction A in FIG. 16.

FIG. 20 is a schematic illustration of the time sequence of the electrical pulses of a time control element, an electro-optical scanner, and an AND member.

Figure 21:
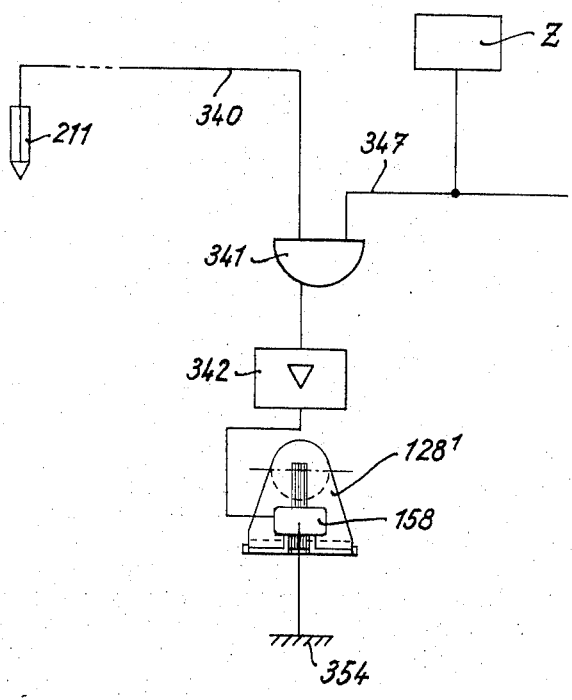

FIG. 21 is a circuit diagram relating to the electrical connection between a scanner and a time control element, on the one hand, with a control magnet, on the other hand; and FIG. 22 is a lateral view, partially in section, of a jacquard portion provided with a control box.

FIGS. 23 and 24 show a special construction of a jacquard portion, particularly with respect to the control head.

FIG. 23 shows a vertical cross section through the control head and the jacquard portion along the section line XXIII—XXIII in FIG. 24.

Figure 23A:
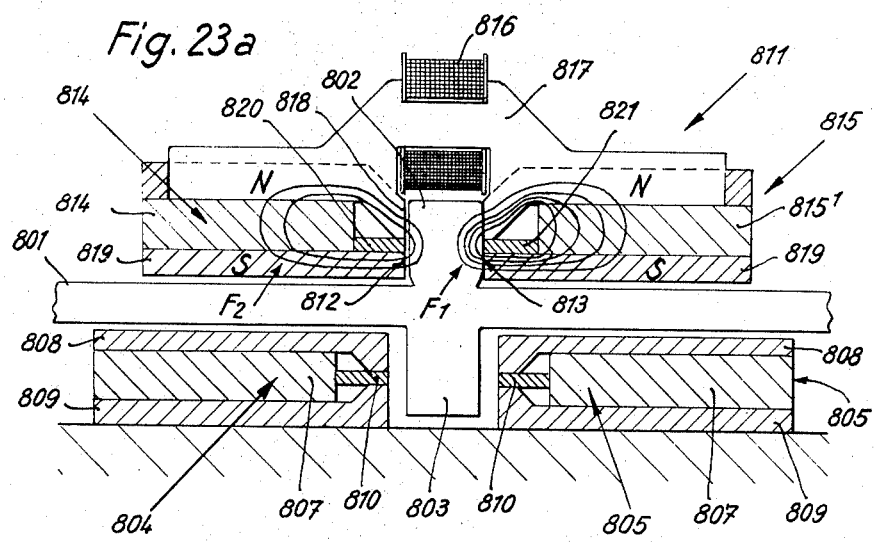
Figure 23B:
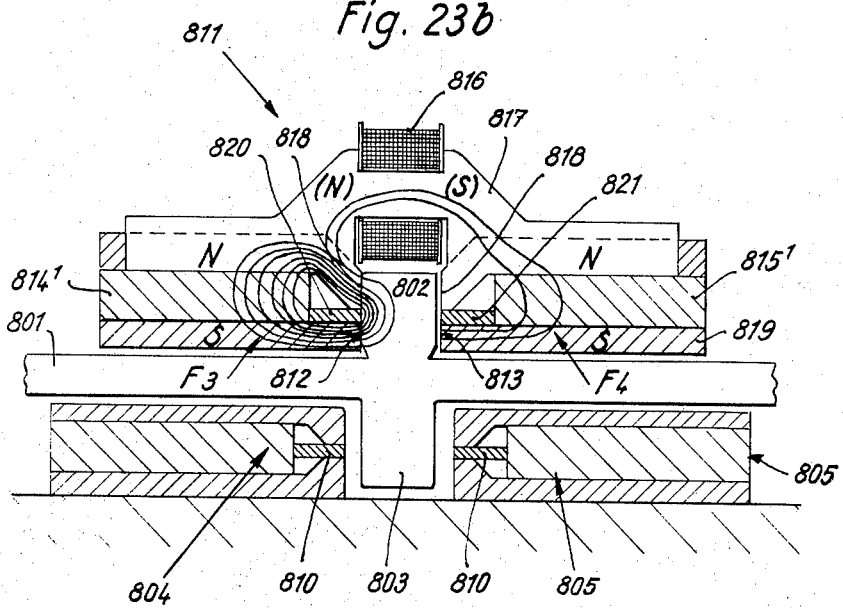

FIG. 24 shows a horizontal partial section through the control head along the section line XXIV—XXIV in FIG. 23, including a switching diagram and the illustration of a pulse sequence similar to FIG. 20; and FIGS. 23a and 23b show, on an enlarged scale, partial cross sections through the control head of FIG. 23.

FIGS. 25–27 show—partially in section—in a plan view, as well as in two cross sections, a particular embodiment of the control head. FIG. 25 corresponds to a partial view of FIG. 24, FIG. 26 corresponds to a vertical cross section through the control head along the section line XXVI—XXVI in FIG. 25, and FIG. 27 corresponds to a vertical cross section, in parallel to the cross section of FIG. 26 along the section line XXVII–XXVII in FIG. 25.

FIG. 28 shows, in an enlarged view, the end of a control element remote from the control head, which control element can establish the operative connection to a transverse needle with the aid of a connecting member.

FIG. 29 shows a vertical partial cross section, corresponding to FIG. 28, of the connection point between the needle bed and the control box, there being interposed as the force-transmitting intermediate member a bell crank between the control element and the transverse needle.

FIG. 30 shows a partial plan view of the connection point according to FIG. 29, as seen in the direction of arrow C.

FIG. 31 shows a partial plan view of the pattern wheel, wherein the control elements are radially arranged, on an enlarged scale.

FIG. 32 is a front view, partially in section, of the upper jacquard portion similar to FIG. 19.

Figure 33:
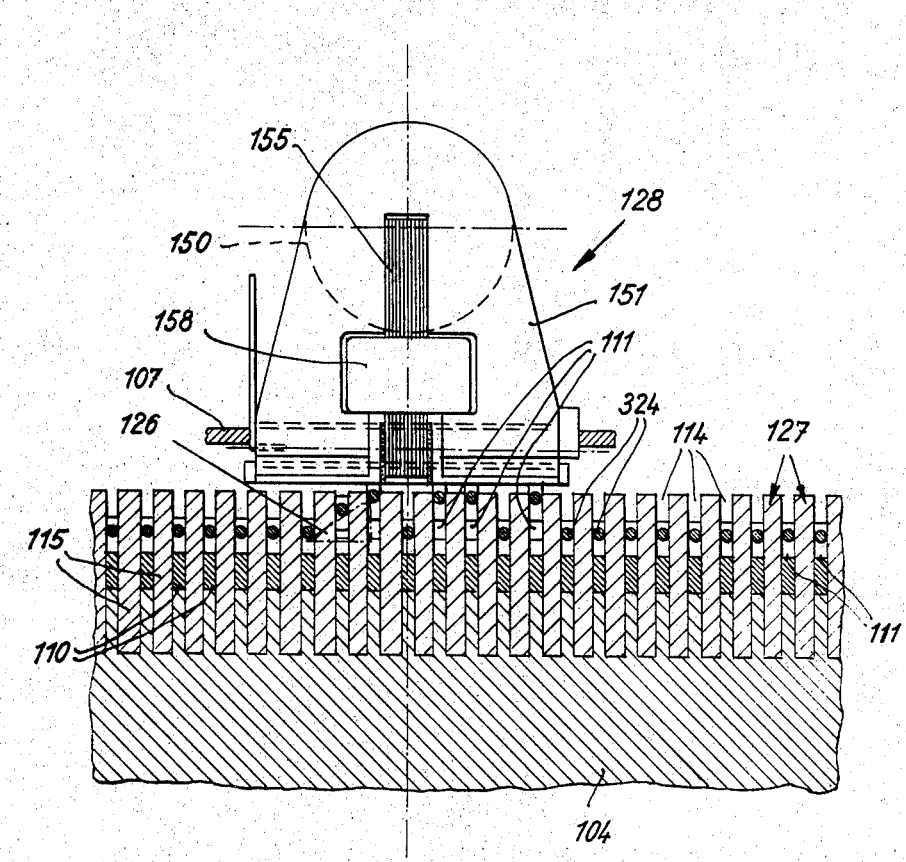
Figure 34:
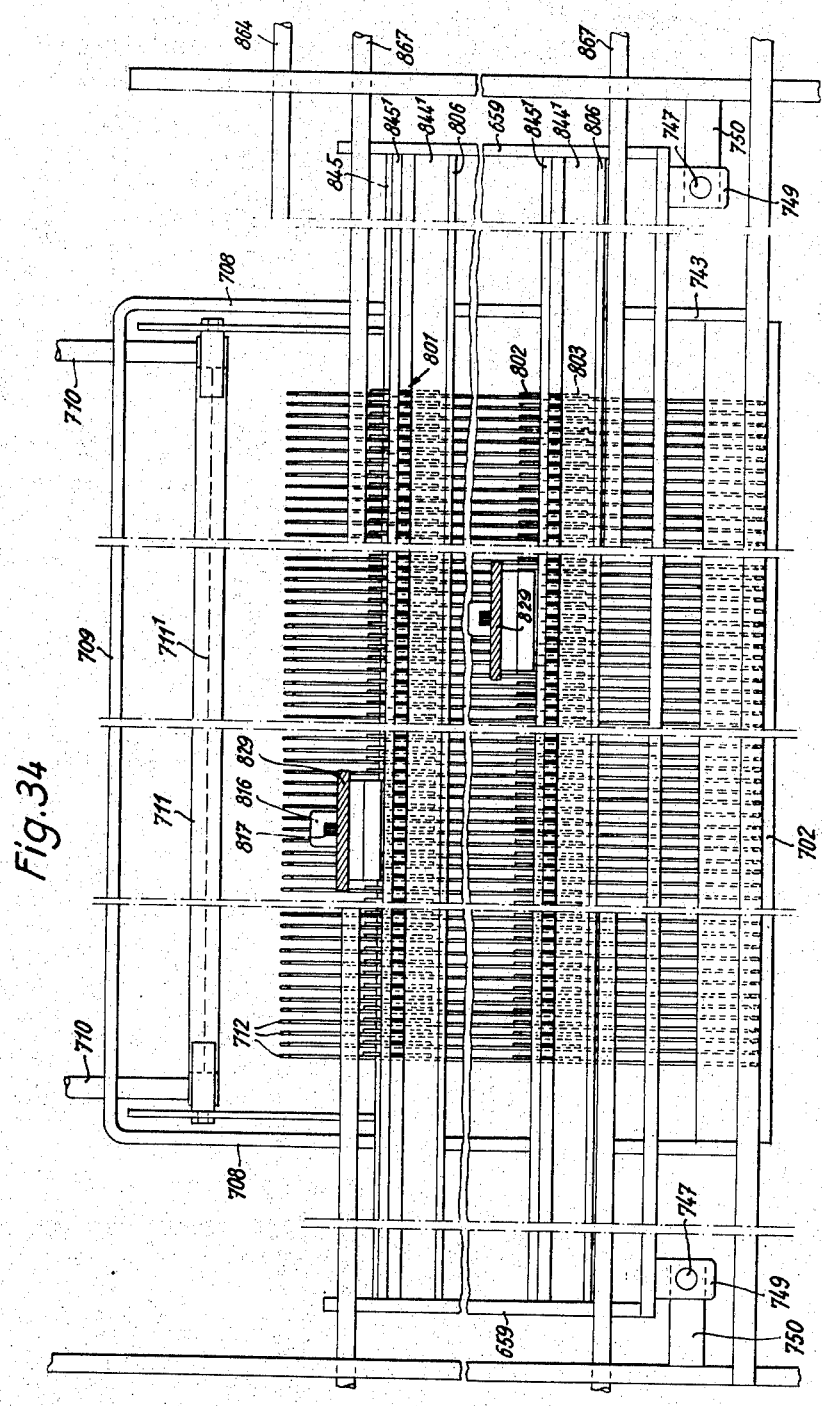

FIG. 33 shows a section through the needle bed along the section line XXXIII—XXXIII in FIG. 2; and FIG. 34 illustrated a front view, partially in section, of the jacquard portion in the embodiment according to FIG. 23.

The control device of the present invention will first be described in greater detail in connection with a knitting machine 100, as it is shown particularly in FIGS. 1 and 2. Reference numeral 101 denotes the knitting machine proper, also called a "working device." On the left-hand side thereof, there is a further working device 102. It is possible to provide a plurality of working devices 101; 102 side-by-side. Each working device has a support 103, as well as two needle beds 104 and 105, arranged in the manner of a roof, and being of conventional construction. There are also provided drive rods 106, 106$^1$, which can execute an axial movement, as described further below in greater detail. Each working device 101, 102 has a control head 107 consisting essentially of a V-shaped slide located with its V-legs above the needle beds 104, 105 and guided in guide rods 108 so that it is longitudinally displaceable. At about the lower end of each control head 107, there is a selecting device, denoted in its entirety with 109. With the aid of this selecting device, the needles 110 to be actuated are selected on the basis of control pulses. Contributing elements in this operation are the coupling members 111, 111$^1$, which can establish the connection between a push rod 106 and the needle 110 pertaining thereto, by engaging underneath a lug 113 of a needle 110. The needles 110 are positioned in groove-like guide slots 114 open at the top (see FIGS. 33 and 3) of the needle bed 104, 105. The needles 110 are provided, in their central portion, with groove-like or laterally open recesses 117 wherein the drive rod 106 is guided in the longitudinal direction of the needle 110 associated therewith. Each drive rod 106 engages, with its finger 119, a curved channel 120, whose extension in the longitudinal direction of the control head 107 can be seen clearly from FIGS. 3 and 6, and which is also indicated in FIG. 1. The drive rod 106 carries, via a spring bar 124, the coupling member 111. The spring rod extends even beyond the coupling member 111 and projects with its offset end 125[1] into the zone of a feed wedge 126 serving as the feeding means. Bars 115 inserted in the needle beds 104, 105 can be provided, in the manner of a comb, with guide plates 127 projecting parallel to the direction of the spring bars 124, preventing an inadvertent displacement of these spring bars in the feeding direction of the control head 107. The coupling members 111 are controlled by control magnets 128 belonging to the selecting device 109 and attached on each of the legs of each control head 107. Each needle 110 is additionally provided with a return finger 121 by means of which the needle engages a return cam 122 of the control head 107. In FIG. 3, the guide slots 114, the knitting needles 110 guided therein, the return finger 121 thereof, and the return cam 122 pertaining thereto are clearly illustrated. In this connection, the needles in the top position are designated by 110, corresponding to the right-hand portion of FIG. 2; the needles in the bottom position are designated by 110[1], corresponding to the left-hand portion of FIG. 2. In the embodiment of FIG. 3, the drive rods 106 are of the same width as the needles 110 and are mounted in the guide slots 114 thereof. These drive rods 106 engage, with their fingers 119, the curved channel 120. In this embodiment, leaf springs constitute the spring bars 124 and carry the coupling members 111. For the sake of clarity, the bars 115 have been omitted in FIG. 3 and in the right-hand portion of FIG. 2. In FIG. 3, the attracting areas 133 are shown in dot-dash lines, and the selecting section 134 of the control magnets 128 is shown in cross hatching. Reference numerals 133, 134 together denote the contact surfaces 133, 134, also called the track, of the control magnet 128.

The control magnet 128 is shown in more detail in FIGS. 7 and 8. A control magnet 128 is provided with a permanent magnet 1350 which is in operative frictional connection with soft iron poles 153, 154, by way of pole legs 151, 152, so that the force field of the permanent magnet 150 is effective at the attracting area 133 and control section 134. The soft iron poles 153, 154 are of the sleeve type and are rotatable in the pole legs 151, 152, being clamped in these legs, so that, for example, the planar attracting area 133, and/or the control section 134 pertaining thereto, can be somewhat pivoted and thus adjusted to the displaced position of the coupling member 111, as is clearly shown in FIG. 8. This adjustment can also be accomplished by pivoting the entire control magnet 128. The control magnet 128 is furthermore provided with a block of laminae 155 clampingly contacting, in the control section 134, the parts 153 and 154. The entire magnetic track is subdivided by two very small recesses 156 into three sections, namely, a left attracting area 133, a control section 134, and a right attracting area 133, the two attracting areas 133 being connected, via the pole legs 151, 152, with the permanent magnet 150. The laminations 155 establish a connection between the central magnetic track section representing the control section 134 and the permanent magnet 150. Thereby, the objective is attained that this control section and the adjacent attracting areas 133 are provided with a permanent magnetic field. On the other hand, the above-mentioned recesses 156 take care that a dynamically built-up magnetic field in the control section 134 does not have any effect, or has only an insubstantial effect, upon the lateral attracting areas 133. The laminations 155 carry electric coils 158 fed by a control current. The recesses 156 are so narrow that they can easily be passed over by the coupling members 111, so that a smoothly continuous track 133, 134 is retained. Moreover, the recesses 156 are filled with non-magnetizable material. The magnetic track 133, 134 is penetrated in the longitudinal direction, in a conventional manner, by a rod-shaped sapphire stone 189 which projects somewhat beyond the magnetic track at the rims.

The mode of operation of the control magnet 128 can be seen in FIG. 7. The control magnet 128 is assumed to move past the coupling members 111 in the direction of the arrow 160. The feed wedge 126, which is in the operative position, engages the lower ends 125 of the spring bars 124 which are illustrated in FIGS. 7 and 8 with a round cross section, in contradistinction to FIG. 3. With the aid of the left feed wedge 126, the coupling members 111 are fed to the left section 133 of the guide track, here constructed as a magnetic track and being designated in its entirety by H. The coupling members 111 then pass into the selecting region $a$ of the magnetic track H, called control section 134 in this application. If there is no pulse transmitted by the coils 158, the coupling members 111 also slide across the right-hand recess 156 and adhere to the right-hand section of the magnetic track 133 until the control magnet 128 has moved past these coupling members. Only then do the coupling members return to their starting position, on account of the force of the spring. Howevere, in this zone, the drive rod 106 has already moved the coupling members 111 in the direction of reciprocation of the needles, to such an extent that there is no longer possible a connection of the coupling member 111 with its needle 110. The situation is different if a control current via the coils 158 compensates the field of the permanent magnet in the liminations 155 and thus in the selecting range $a$, or even over-compensates this field. In such a case, the coupling member 111$a$ (see FIG. 7) is freed in the control section 134 from the magnetic track and assumes its engaging position, as shown in FIG. 2, left-hand portion. During the subsequent movement of the drive rod in the upward direction, the needle 110[1] is moved by the drive rod 106[1] via the coupling member 111[1] from the bottom position. The top positions of the needles 110 resulting therefrom can be seen well from the right-hand portion of FIG. 2 and in a few needles of FIG. 3. The thus-controlled needles 110 then cooperate in a conventional manner with the threads 180, 181, 182 which are fed to the needles from the thread spools 183, 184, and 185 via the control head 107.

As can be seen clearly from FIGS. 3 and 6, the shape of the curved channel 120 and/or the return cam 122 is synchronized to the position of the control magnets 128. The curved channel 120 is ascending and descending in a symmetrical manner, and the ends 120[1] thereof terminate in the bottom position for the drive rods 106 (see FIG. 6). Lifting wedges 190 are provided below the ends 120[1] of the curved channel of the drive rods on the control head 107. These wedges prevent an undesired and uncontrolled actuation of the coupling members 111 at the beginning or end 120[1] of the curved channel 120.

The symmetrical configuration of the curved channel 120 makes it possible for the knitting machine 100 to operate by movement of the control head to and fro in a line-by-line manner. As can be seen well from FIGS. 6 and 7, the selection proper and the coupling movement of the coupling member 111 require only a short path and accordingly only a brief period of time, while a substantially longer period of time is available for the reciprocating movement of the needles 110, as can be seen from the course of the curved channel 120.

The switch-over device for the feed wedges 126 and 136 can be clearly seen in FIG. 6. These wedges are arranged at right angles to each other and are rotatably mounted on a pivot pin 170 (see also FIG. 2). The wedges are connected with an adjusting rod 172 via adjusting levers 171. The adjusting rod is attached to a switch-over lever 173, the latter being connected with the control head 107. When the control head arrives at the left terminal position, the switch-over lever 173 contacts an abutment 174, whereby the switch-over lever 173 is placed into the right-hand position 173[1], shown in dot-dashed lines. Correspondingly, the parts 171, 172, 126 and 136 are shifted into the positions shown in dot-dash lines. When the control head 107 then moves to the right, the same above-described mode of operation results at the control magnets 128. On the right-hand side of FIG. 6, the abutment 174[1] for the right-hand terminal position of the control head 107 is shown in dot-dash lines. For the sake of clarity, portions of the housing of the control head 107 have been omitted. In place of the above-disclosed mechanical switching procedure, for example an electromagnetic of electropneumatic switching of the feed wedges 126, 136 can also be used.

The electrical control pulses for the control magnets 128 can be derived, for example, from a suitable storage means, for example a magnetic tape. However, preferably, the control is via a scanning device, designated in its entirety with 200, which scans a pattern 203. This is described below particularly in connection with the right-hand portion of FIG. 1, as well as with FIGS. 4 and 5. Reference numeral 201 designates a drum which can be rotated stepwise. The drum carries a belt 202 on which the pattern 203 is provided. On both sides of the roller 201, there is a ratchet wheel 205 which is engaged, depending upon the direction of rotation, by one of the feed rods 206[1] or 206[2]. The drum 201 is mounted by means of the shaft 207 in the frame 208 of the scanning device 200. Above the crest of the belt 202, a scanning head 210 is provided which carries three electro-optical scanners 211. The scanning head is connected, via a connecting rod 212, with the control head 107 of the working device 101. If desired, it is possible—as in the embodiment of FIG. 1—for this connecting rod 212 to connect several control heads 107 and, if desired, also several scanning heads 210. The spacing $c$ between respectively two neighboring scanners 211 corresponds to the distance $c$ between two control magnets. To the individual scanners 211[1], 211[2], 211[3], the control magnets 128[1], 128[2], and 128[3] are assigned, and corresponding parts are also electrically connected via electrical lines 214. Electrical switching blocks S are inserted in these lines, as will be explained in greater detail below.

When the scanning head 210, and at least one control head 107, connected synchronously with the scanning head by means of the connecting rod 212, moves to the left in one of the directions of the double arrow 215 in FIG. 1, first the scanner 211[1] which is the first to sweep over the pattern 203 scans the individual picture points. Once a scanner responds to a color of the pattern 203 assigned to it, at a predetermined location, the control magnet 128[1] belonging thereto receives a control pulse. The coupling member 111, slidingly adhering to the magnetic track H of the control magnet 128[1], passes at this time the control section 134 of the control magnet track H. In this control section 134, the coupling member 111 is released when an electric control pulse is present and is moved by the spring rod 124 into its starting position where it engages underneath the lug 113 of the needle 110, so that a corresponding needle movement is initiated. The return of the needles 110 is effected by the return cam 122. Because of the different construction of the return cam 122 as compard to the curved channel 120 of the drive rod, the drive rods 106 always execute an upward and downward motion when the control head 107 passes by them. However, the needles 110 can also remain in the basic position, as can be seen well from the right side of FIG. 3.

In a raster pattern 203, the individual raster fields of this pattern are adapted to the position of the control head or heads 107 and are synchronized therewith. Such a synchronization can be conducted for example with the aid of a time control element Z. With the aid of such a time control element, the control pulses generated by means of electro-optical scanners 211 can be matched in time to the position of coupling elements in the selecting zone $a$ of the control magnets 128. In this connection, the invention provides a sturdy time control element Z which can be well regulated with respect to its operation.

In FIGS. 9–11, an embodiment of such a time control element Z1 is illustrated, and FIG. 1 shows the cooperation of this time control element with the knitting machine 100. The time control element Z1 is provided with a stationary base plate 300 fastened to the frame 208 of the scanning device. A shaft 301 is mounted in the base plate 300, this shaft carrying a gear 302 engaging a rack 303. The rack is moved to and fro with the scanning head 210 or the connecting rod 212, as indicated by the double-arrow 215 in FIG. 1, and is connected with these parts via a crosspiece 510. The shaft 301 carries a base disk 304, a control disk 305 being exchangeably mounted to this base disk and connected therewith so that it cannot rotate relative thereto. On the control disk 305, several rows 306, 307, 308 of optical scanning surfaces 309, tapering in the radial direction, are provided. Furthermore, the time control element Z1 is provided with a housing 310 carrying two optical scanners 311, 312. Each scanner 311, 312 is displaceable in the direction of the tapering of the scanning surfaces 309, and thus in the present case in the radial direction. For this purpose, the scanner is provided with a sliding block 313 which can be shifted in an oblong hole 314 and can be accurately adjusted by means of a set screw 315. The oblong holes 314 are provided in pivotable levers 316 which can be pivoted by means of further set screws 31 throughout the segment-shaped recesses 318. Thereby, it is possible to shift the optical scanners 311 and 312 in the direction of the rows of the scanning surfaces 309, i.e., in the present case, in the circumferential direction.

In place of the circular control disk 305 of FIG. 11, it is also possible to employ a linear control plate 320 as shown in FIG. 12; this plate is mounted to the frame 208 of the scanning device 200, as shown in FIG. 1 by dot-dash lines. However, here again it is possible to carry out, with the aid of set screws 321, a relative displacement between the scanning surfaces 309 and an optical scanner 322 in the direction of tapering of the scanning surfaces 309. In the last-mentioned embodiment of the time control element Z2 having the linear control plate 320, the scanner 322 is mounted, in a reciprocating manner, at the scanning head 210. Also the linear-type control plate 320 has three rows of tapering optical scanning surfaces 326, 327, 328 which, however, extend in parallel with the direction of travel.

A time control element of the Z1 type scans, for example, with an optical scanner 311, time intervals which can be set with respect to their duration. The length of the time intervals depends upon whether the scanners 311, 312 sweep over the triangular scanning surfaces 309 closer to the tip thereof or closer to the base thereof. It is also easily possible to set the start of the pulses coming from the time control Z: in case of the time control element Z1, by pivoting the levers 316, and in case of a time control element Z2, by longitudinally displacing the linear control plate 320, which can be done by means of set screws 329 oriented in the longitudinal direction; these set screws are effective in a similar manner, as is illustrated in FIG. 12 and 13. In this manner, the control pulses obtained with the aid of the electro-optical scanners 211 can be made effective in those instants which correspond to the respective exact position of the control head 107, or the position of the control section 134 of a control magnet 128 belonging thereto.

The circuit shown in FIG. 21 is employed, for example, to utilize these time control elements. It is shown in FIG. 1 schematically as the switching block S. An electrical line 340 leads from a scanner 211 to a so-called "AND-member" 341. The AND-member is a conventional electrical circuit element which passes an electrical input pulse only if another pulse is simultaneously applied on the input side. If the scanner 211 emits a signal and, at the same time, a further signal is applied from the time control element Z, AND-member 341 transmits a pulse to the amplifier 342 which applies the desired control pulse to the control magnet $128^1$. The pulses emanating from a time control element Z are illustrated in FIG. 20 by the curve 1; the pulses coming from the scanner 211 are shown in curve 2; and the control pulses passed on to the control magnet $128^1$ are represented by curve 3. If, for example, at the start of pulse 343 of the time control element Z, there is simultaneously present a scanning pulse 344, a pulse 345 is transmitted to the control magnet 128, and this occurs at an instant predetermined by the time control element Z. In contradistinction thereto the pulse 346 coming from the scanner 211 is not passed on to the amplifier, or to the control magnet $128^1$ since at this point in time there is no pulse present from the time control element Z. Corresponding considerations apply with respect to the other scanners $211^2$ and $211^3$, it being possible for one time control element Z to emit one pulse along line 347 for all scanners and the respective AND-members 341 etc. pertaining thereto.

By the use of such time control elements, it is possible to employ in certain cases control patterns which have not previously been broken up into individual raster fields. The picture portion 299 of FIG. 4 shows such a contour which is independent of the raster structure. The time control element Z then takes over the picture resolution otherwise effected by the raster. Whether a raster system is used or not, a time control element Z at least effects a precise synchronization of scanning point and the geometrical control position pertaining thereto, and the instant of selection for this particular point at the control magnet 128. Time control elements Z can be, if desired, also those which do not operate in an electro-optical manner.

In the second embodiment described in the following, the invention is explained in connection with its use in a jacquard-type loom, FIG. 14 representing a schematized front view of the entire jacquard machine 400 together with the scanning device 500, and FIG. 15 illustrating a cross section along the line XV—XV in FIG. 14. A machine frame 430 carries the jacquard part 401 proper and the control device according to the invention, i.e., the control head K which is longitudinally displaceable in synchronism with electro-optical scanners 211 via push rods 417 whose drive is not illustrated for reasons of clarity. The push rods 417 can be shifted, for example, via gears which engage the rack 303 similarly to the gears 302. In FIGS. 14 and 15, the blade box 411, provided with two pistons 410, is illustrated in its top position.

As shown, for example, in FIG. 16, harness cords 414 pass through the sinker base 402 through a perforated board 441 guiding these cords to the loom 10 proper. This loom is provided with the conventional warp threads 13, which are connected with the cords 414. The harness cords 414 are tensioned by weights 11. The warp threads 13 are reeled off a thread spool 12 in a conventional manner, to form the weaving panel 14 through which the shuttle is driven by means of striker arms 15. A roller 16 pulls the finished fabric 17 forward in the direction of the arrow 18.

In FIG. 16, the actual jacquard portion is denoted in its entirety by 401. This portion is provided with a sinker base 402, as well as with so-called transverse needles 403, the latter being displaceable in their longitudinal direction, thereby controlling the sinkers 404. The transverse needles 403 are guided in the needle boards 405, 406 and are connected, via eyes 407, with the sinkers 404. In FIG. 16, only two rows 416 of transverse needles are illustrated. The rows extend at right angles to the plane of the drawing. As is conventional, jacquard devices are often provided with numerous transverse needle rows 416, arranged one below the other. Each individual transverse needle 403 is connected with respectively one individual sinker $404^1$, $404^2$, and controls the same. The needle boards 405 and 406 are connected in the manner of a box via side walls 408. These side walls 408 taper toward the top and are there connected with each other via a traverse 409. The traverse 409 is penetrated by pistons 410 attached to the blade box 411 and initiating the movement of the blade box. The blade box 411 carries the lifting blades $411^1$ which move underneath the sinker lugs 412 when the sinkers $404^2$ pertaining thereto are in the non-pivoted position, as shown in connection with the right sinker $404^2$ in FIG. 16. On the left-hand side beyond the needle board 406, rear abutments 413 are provided for the transverse needles 403. Also located here are needle springs $413^1$ which attempt to move the transverse needles 403 into their rear abutment position. At the lower end of the sinkers 404, harness cords 414 are provided which control, in the conventional manner, the warp threads or warp thread groups of the jacquard machine 400. These cords 414 pass through perforations 415 of the sinker bottom 402. The sinkers and their harness cords represent thread-working members. On the right-hand side of the jacquard portion 401, the control head is illustrated, designated in its entirety by K. This control head is longitudinally displaceable along the transverse needle rows 416 by means of push rods 417, displaceably mounted in the machine frame, and is fixedly connected with these push rods 417 by pins 440 or the like. The control head is provided with a drive device denoted in its entirety with 418, the latter having a drive cam 419. Each transverse needle 403 has a lug 422. In the rear abutment position, as occupied by the upper transverse needle $403^1$ in FIG. 16, the drive device 418 can engage with its control cam projection 420 the lug 422 of the transverse needle, as shown particularly in FIG. 18. Reference numeral 421 denotes a coupling member which can engage behind a stationary holding bar 423; this coupling member is connected, via a spring bar 424, with a transverse needle 403 belonging thereto. Correspondingly, the coupling member 421 follows the longitudinal movements of the transverse needles 403, as shown by the double arrow P/1 of FIG. 16, but it can also be deflected upwardly. The basic position of the spring rod is illustrated at the bottom of FIG. 16 at $424^2$. A central position of the spring rod $424^1$ is shown. The spring rod 424 extends, with its end 425 facing away from the transverse needle, beyond the coupling member 421 into the region of feed wedges 426 which are pivotably attached to the control head K. The control head carries control magnets 428 above the coupling members 421. The control magnets correspond to the magnets 128 of the knitting machine 100. Corresponding considerations apply for the mode of operation of the coupling members 421, the spring rods 424, their ends 425, and the feed wedges 426 as did for the coupling member 111, the spring rod 124, its end 125, the feed wedges 126 pertaining thereto, as well as the control magnet 128 of FIG. 1 and particularly FIG. 2.

In FIG. 17, the plan view shows clearly a portion of the control head K whose front plate 427 is connected, by pins 440 or the like and bearing 470, with the push rod 417. The front plate 427 holds supporting arms 429 on which the control magnets 428 are attached and which are provided, at their ends at the side of the transverse needles, with the drive device 418.

In FIG. 19, corresponding to the view in the direction of arrow A in FIG. 16, the jacquard portion 401 is shown, shortened with respect to its width, and there is also shown a scanning device beside this jacquard portion, belonging thereto. These parts are held substantially by the frames 430 of the machine base. In this connection, the scanning device 500 is constructed substantially like the scanning device 200, described in detail in the foregoing. The drum is denoted by 501 and carries the belt 502, moving the latter in a stepwise manner. This belt 502 carries the pattern 503. Reference numeral 504 denotes ratchet wheels which are engaged selectively by respective feed rods $506^1$ or $506^2$. The shaft of the drum 501 is designated by 507. Above the crest line of the drum 501, there is a scanning head 210 with three scanners 211, in correspondence with FIG. 1. The scanning head 210 is connected, by way of the push rod 417, with the control head K of the jacquard portion 401. The rack 303 moves in parallel with the push rod 417. A crosspiece connecting the scanning head 210 with the rack 303 is denoted by 510. For the sake of clarity, the base plate 300 is not shown in this figure.

In the jacquard portion 401, the piston 410 can be seen contacting the blade box 411. A control magnet 428 is assigned to each row 416 of transverse needles, offset laterally to one another by the distance $c$ corresponding to the lateral separation between the scanners 211. By way of electrical lines 511, 512, 513, the scanners 211 are connected with the control magnets 428 belonging thereto. The rack 303 is connected via a gear 302 with the time control element designated in its entirety by Z1; this time control element is shown schematically and with scanners 311 illustrated in the plane of the drawing.

The feed wedges 426 and 436 of FIGS. 16 and 19 correspond to the feed wedges 126 and 136 of FIG. 6. In FIGS. 16 and 19, there is a good view of the switch-over device for the feed wedges 126, 136, or 426, 436, the same reference numerals being used in FIGS. 16 and 19 as in FIG. 6.

The mode of operation of the jacquard machine 400 is similar to that of the knitting machine 100. Here, too, the control head K is moved in a reciprocating manner in the direction of the double arrow $Pf2$ of FIG. 17, i.e., along the rows of the transverse needles 403 arranged side-by-side. In this operation, the drive cam 419 of the driving device 418 engages the lugs 422 of the transverse needles 403 which are in its range, and displaces them against the force of the needle springs $413^1$ in the longitudinal direction toward the control magnets 428. Thereby, the lug 460 of the coupling member 421 arrives in front of the supporting bar 423. On this motion of the coupling member 421 is superimposed, just as in the case of the coupling member 111 in the knitting machine 100, a further motion. This motion is caused by the feed wedges 426 or 436 and moves the coupling members to the magnetic track 133, 134 of the control magnets 428; the attracting track is called H for purposes of abbreviation. When a control magnet 428 receives a corresponding control pulse at the time a certain coupling member 421 is within the selecting zone $a$ of the control magnet 428 (see FIG. 7), the control magnet 428 releases the coupling member 421 and the spring rod 424 pulls it in the lower position, as shown in the bottom portion of FIG. 16. The lug 460 of the coupling member 421 engages behind the stationary holding bar 423, so that the transverse needle 403 cannot be moved into the rear terminal position by the needle spring $413^1$ belonging thereto. Correspondingly, the sinker $404^2$ is maintained in the zone of the lifting blades $411^1$, even when the cam 419 no longer engages the lug 422 of the transverse needle $403^2$. If the coupling member 421 is not freed within the selecting zone $a$ adapted to the cam 419, there is no connection between the coupling member 421 and the holding bar 423, and the spring $413^1$ of the needle restores the needle $403^1$, as shown in the upper part of FIG. 16, to its rear terminal position. Thereby, the sinker $404^1$ pertaining thereto is pivoted out of the range of the lifting blades $411^1$.

Once the entire control head K has passed by all transverse needles 403, the selection of the sinkers 404 has been accomplished, and the blade box 411 can execute its upward and downward stroke, as is customary in jacquard machines. The control pulses for the control magnets 428 can be drived, in the manner described above, either from storage units or from the scanning device 500 which operates substantially as the above-disclosed scanning device 200. The path of the control head, however, can also be subdivided into individual partial sections 901, 902 as shown in FIG. 14a, for increasing the operating speed. Between the individual partial sections 901, 902, there is a zone 903 wherein there are no transverse needles 403, 642, or adjusting (setting) members 801. The control head or heads K present within the entire rows of needles reverse their travel on coming to this zone. FIG. 14a also shows the neutral zone $903^1$ of the belt 502, corresponding to the zone 903.

To each partial section 901, 902, a control head K1, K2 and one scanning head $210^1$, $210^2$, respectively, is assigned. The control or scanning heads K1, K2 and $210^1$, $210^2$, positioned side-by-side, then travel spaced from each other and pass through respectively one partial section 901, 902. This side-by-side arrangement of several control heads is also advantageous in the third embodiment, described further below. Substantially shorter control time periods are obtained. Furthermore, a larger spacing between the individual transverse needles 403, 642, or the like, such as parts 801, is easily possible, as can clearly be seen from FIG. 14a.

FIG. 22 shows an embodiment 601 somewhat modified as compared to the jacquard portion 401 in FIGS. 16–19. In this embodiment, the transverse needles 603 do not interact directly with the control head K, but they are actuated by pre-control needles 642 which are mounted in a control box $St$. However, in other respects, the left zone of the jacquard portion 601 corresponds to the zone of the jacquard portion 401 of FIG. 16 which is located to the left of the needle board 405; for this reason, corresponding parts of the machine have been designated by analogous reference numerals, such as 602, 603, etc. The needle springs $413^1$, however, tend to press the transverse needles 603 to the right, and for this reason, these needles are provided with an abutment lug 613. This lug corresponds to the abutment 413 of FIG. 16; in connection with the transverse needles 403, the initial position thereof corresponds to their left terminal position, whereas in the transverse needles 603 of FIG. 22, the right terminal position illustrated represents the initial position. The sinker base 402 or 602, respectively, is connected in a stationary manner, as is conventional, with the needle boards 405, 406, or 605, 606, in both embodiments.

The function, mode of operation and most structural elements of the control box $St$ correspond to the entire jacquard portion 401 of FIG. 16. In place of the transverse needles 403 of the jacquard portion 401 which are directly moved during the control operation, there are now controlled pre-control needles 642 which move their respectively assigned, but separated, transverse needles 603 by a displacement of the control box $St$ thereby changing the position of the sinkers 604. The reference numerals of corresponding parts have, as the first digit, a 6 in place of a 4. An explanation of these parts is, for the most part, superfluous.

The control box $St$ has a bottom 643, as well as needle guides 644 the pre-control needles 642. These needle guides have stop bars 645 for lugs 655 of the pre-control needles 642. In a similar manner as for the needle springs $413^1$, the pre-control needles 642 also have pre-control needle springs 646 which tend to press these needles into the left abutting position limited by the lug 655. The control box $St$ has a front plate 627 which is mounted, like the front plate 427, to at least one push rod 617, by way of bearings 670 via pins 640 or the like. In this connection, these push rods 617, just as the push rods 417, are mounted in the stationary frame of the machine in a longitudinally displaceable manner, and there is a connection to the scanning head 210. In the embodiment 601 of FIG. 22, this connection is established by the angular lever 656. This lever is connected in the manner of a joint at the front plate 627 of the control head K. In contradistinction thereto, the supporting lever (bearing lever) 658 wherein the shaft 507 of the drum 501 is mounted, is fastened to the side wall 659 of the entire control box St.

The entire control box St is displaceably mounted, by way of its bottom 643, on guide pins 647, to be movable in the travel direction of the transverse needles 603, as illustrated by the arrow 648 in FIGURE 22. The connection between a bearing pin 647 and the bottom 643 of the control box is established by bearing bosses 649. A tension spring 661 is provided between the front bearing boss 649 and a stationary part 650 of the machine base; this tension spring attempts to hold the control box St in its left terminal position. A sliding block 664 cooperates with a sliding block lever 662, as well as a sliding block pin 663, fastened to the blade box 611 and reciprocating therewith. This sliding block 664 is provided with a slot 665, extending in the upper portion in parallel to the direction of travel of the piston 610. The block is bent at its lower end in the direction toward the control box St. When the blade box 611 attains its lower position $611^2$ shown in dot-dash lines, as per the arrow Pf6, the entire control box St is moved, by the sliding block pin 663, in the direction of the arrow 648 toward the transverse needles 603. Pre-control needles projecting toward the left, as well as the upper pre-control needle $642^1$, displace the transverse needles 603 assigned thereto, so that a sinker $604^2$ connected therewith is pivoted into the position $604^1$ shown in dashed lines in FIG. 22. During this movement, it is placed outside of the range of the lifting blades $611^1$.

The front plate 627 of the control head K is guided in a rail 651 of the bottom 643 of the control box, in the direction of the tows of transverse needles, and/or the direction of the row of the pattern to be scanned. Also, the front plate 627 of the control head K is provided with supporting arms 629, analogous to those of the front plate 427 of the jacquard portion 401 of FIGS. 16–18. These supporting arms are provided at their free ends with a driving device 618 corresponding to the driving device 418, this device having a cam 619. The control magnets 628 mounted to the supporting arms 629 operate, in conjunction with the coupling members 621, the spring rods 624, and the feed wedges 626, in the same manner as has been described above in connection with the jacquard portion 401. The feed wedges, which are not in engagement and which correspond to the feed wedges 536 of FIG. 16, as well as the adjusting device pertaining thereto, have been omitted in FIG. 22 for the sake of clarity.

In FIGS. 22 and 32, there is additionally provided a locking device for the pre-control needles 642, designated by 690 in its entirety. This locking device has clamping rails 691, adjustable with respect to their elevation. There is one rail for each row of pre-control needles. The clamping rails are guided in pins 692 and are connected with one another via at least one height-adjustable clamping bolt 693. This clamping bolt is pressed downwardly by a contact piece 694, elastically mounted on the blade box 611, when the precontrol needles 642 have assumed their control position. Compare the differently set pre-control needles $642^1$ and $642^2$. The fixed positioning of the pre-control needles is done, however, before the stroke of the control box St in the direction of the arrow 648. Because of the above-described locking device 690, the pre-control needle springs 646 do not have to be substantially stronger than the needle springs $613^1$ for the pre-control needles 642 to retain a fixed position after the selecting process.

In FIGS. 23–27, a further development of the invention is described. The embodiment of these figures makes possible a particularly advantageous control of numerous control elements positioned side-by-side and having small control paths. The jacquard portion, designated in its entirety by 701, is substantially similar to the jacquard portion 601, as a comparison of FIGS. 22 and 23 will show.

Correspondingly, the machine parts pertaining to the left region are again designated analogously to FIGS. 16 and 22, by 702, 703, etc. The sinker bottom 702, the transverse needles 703, and the sinkers 704 with the sinker lugs 712 can be seen in this drawing, and furthermore the needle boards 705 and 706, the eyes 707 of the transverse needles 703, the side wall 708, the adjoining traverse 709, the piston 710 of the blade box 711 having lifting blades $711^1$, the abutment lugs 713 of the transverse needles 703, and the needle springs $713^1$. At the bottom of the sinkers 704, there are again provided the harness cords 714, the perforations 715 of the sinker base 702 being provided for passing these cords therethrough. As is known, numerous rows 716 of transverse needles 703 can be arranged one below the other, while in the drawing only two rows 716 of transverse needles are illustrated. The control box, again designated by St, is arranged to be displaceable in the longitudinal direction of the rows 716 of transverse needles, just as in the embodiment 601, and has, for this purpose, a bottom 743 of the control box which is movably connected with a guide bolt 747 via bearing bosses 749. This bottom is mounted to the stationary portion 750 of the machine frame, and a tension spring 761 is provided between the left machine portion $750^1$ and the neighboring bearing boss 749. A stationary bearing lever 658 at the front plate 827 carries the shaft 507 of the drum 501 around which the belt 502 is looped. The scanning head 210 is connected, via the lever 758, with the control head K, vertically displaceable with respect to the plane of the drawing, and participates in the motion of the control head K.

According to this further development of the invention, control elements 801, similar to the pre-control needles, serve for controlling the transverse needles 703. These control elements, similarly to the transverse needles 603 or 703 in conventional jacquard devices, are mounted longitudinally displaceably in the control box St. Each control element 801 is, in turn, assigned to a transverse needle 703 and mounted in the extension of the longitudinal axis thereof. The control elements 801 are provided, according to the invention, with a projecting control lug 802 consisting of magnetizable material, for example, soft iron. At right angles to the displacement direction of the control elements 801, indicated by the double arrow Pf4 in FIG. 23, there extend two magnetic rails 804 and 805. These rails are arranged on each longitudinal plate 806 of the control box St, in parallel to each other, and at a predetermined spacing from each other. Each magnetic rail 804, 805 is of a double-pole magnet configuration in its profile, and comprises the permanent magnets 807, as well as two L-shaped profile rails 808 and 809. These rails have a slot 810 at their stop lugs 803. The slot 810 is filled with non-magnetizable material.

A control head K, representing a magnetic setting member, is movable at right angles to the direction of movement of the control element 801, as well as in parallel to the magnet rails 804, 805. In this embodiment, this magnetic setting member is designated, in its entirety, by 811. Each setting member is connected, via a supporting arm 829, with the front plate 827 of the control box St. This setting member is provided with two guide tracks 812, 813 for the control lugs 802 of each control element 801. As can be seen clearly in FIG. 24, these guide tracks 812, 813 are first narrowed—as seen in the respective direction of travel—up to the selecting range a. Thereafter, these guide tracks widen again to a point behind the magnetic strips 804 or 805. The magnetic setting member 811 is provided with two strip-shaped elements 814 and 815, respectively, comparable to the magnetic strips 804 and 805, respectively. The narrow sides of these strips, facing each other, form the guide tracks 812 and 813. These elements 814 and 815 have permanent magnets 814$^1$ and 815$^1$. In the embodiment according to FIGS. 23 and 24, a yoke 817 is provided at the top side of the setting member 811. This yoke carries a magnetic coil 816. The yoke 817 connects identical poles of the permanent magnets 814$^1$ and 815$^1$, for example, the north poles thereof. Pole projections 818 are separated from the rails 819 by interposed strips 820 and 821. In this connection, as shown in FIG. 24, there are provided rails or plates 822 and 823, on both sides of the yoke 817 and above the permanent magnets 814$^1$ and 815$^1$. The narrow sides of these rails or plates, facing each other, form sections of the guide tracks 812 and 813 of the setting member 811.

The control lugs 802 of those control elements 801, which are, at a particular instant in the zone of the setting member 811, extend into the space between the guide tracks 812, 813. In the selecting range $a$ of this setting member 811, the range of motion of a control element 801 corresponds to only a fraction of the path of displacement of the stop lug 803 between the magnet strips 804 and 805. When operating the control head K of the present invention, the stop lugs 803 of the control elements 801 first abut one of the two magnet strips 804 or 805. Upon passage of the control head K by the control lugs 802, the latter are lifted off the magnet strips 804, 805 by the guide tracks 812 and 813 and placed into an approximately central position. However, the control lugs 802 are normally still positioned at that guide track 812 or 813 with which they had first made contact. These guide tracks—similarly to the control magnet 128—are magnetic throughout, on account of the above-mentioned permanent magnets 814$^1$ and 815$^1$, and thus effect the attraction of the control lugs 802. At the point of minimum spacing between the guide tracks 812 and 813, the selecting zone designated by $a$ is located. At this location, the control element 801, depending upon the direction of current flow presently ambient in the magnet coil 816, is either retained at its guide track 812 or 813, or moved to the opposite guide track 813 or 812. Upon further advancement of the control head K, which is also called a setting member 811 in this embodiment, the control lug 802 then adheres to the respective guide track 812 or 813 and passes, across the zone of this guide track widening in the direction of travel, into a region where the stop lugs 803 of the magnet strips 804 or 805 retain the control element 801. Since the range of movement of the control lugs 802 of the control elements 801 at the point of selection is very small, only very short control paths occur, which can be on the order of 0.1 mm. Therefore, the selecting process can be executed very rapidly. Also, only a minor amount of electric energy is required for shifting the control elements 801. The magnet coil 816 is controlled in the manner already described above either by storage means or scanners 211.

In FIGS. 23$a$ and 23$b$, the magnetic mode of operation of the control element 811 is illustrated in greater detail with the aid of the field lines F. In FIG. 23$a$, the magnet field coil 816 is without current. The two magnets 814$^1$ and 815$^1$ are therefore effective upon the control lug 802 with approximately identical magnetic forces. Since this control lug, however, contacts the right-hand side, the right magnet 815$^1$ thus exerts somewhat stronger attractive forces upon the control lug 802 than the permanent magnet 814$^1$ whose magnetic field must bridge the space on the left of the control lug 802. The density of the field lines F1 and F2 in FIGS. 23$a$ represents the almost equal magnetic forces.

If the magnetic coil receives an electrical control pulse effective for displacing the control element 801, the magnet coil produces a north pole, as well as a south pole, the south pole compensating the north pole of the right permanent magnet 815$^1$, and considerably amplifying the north pole of the left permanent magnet 814$^1$. The field lines F3 and F4 represent the differing magnetic forces in FIG. 23$b$. Thus, the control element 801 is pulled to the left. The same considerations apply when a control element 801 is to be retained on the same side of a guide track 812 or 813. In such a case, the magnet coil 816 is also allowed to operate, in such a manner that a secure attraction of the control lug 802 to the predetermined magnetic track 812 or 813 is ensured. The circuit illustrated in FIG. 24 can be employed in this connection. This circuit operates substantially as the circuit described in FIGS. 20 and 21, but with the supplementation as described below:

The AND-member 341 of FIG. 24 is not only provided with an output $x$ leading to the amplifier 342, connected, via line 348, with the left side of the coil 816; rather, there is additionally provided an output $y$, of opposite sign or antivalent to that of the output $x$, at the AND-member 341, which output $y$ is connected, via line 349, with a second AND-member 341$^1$. The second input of this second AND-member is connected with the time control element Z. When there is no control pulse from the scanner 211 present at the AND-member 341, the latter does not emit an output signal at the output $x$, but emits in this case an output signal at the output $y$ antivalent thereto. If this output signal coincides with a pulse from the time control element Z, so that two input pulses are simultaneously applied to the second AND-member 341$^1$, this AND-member 341$^1$ emits a control pulse to the amplifier 342$^1$, from where the control pulse is passed on via line 351 to the right-hand side of the coil 816. In correspondence with the different direction of current flow through this coil 816, it generates differently directed magnetic fields which either weaken the field of the right permanent magnet 815$^1$ and strengthen the field of the left permanent magnet 814$^1$ as shown in FIG. 23$b$, or vice versa.

In the upper portion of FIG. 24, the chronological sequence of the electrical pulses is once again illustrated, similar to FIG. 20; the same considerations are true for the curves 1$^1$, 2$^1$, and 3$^1$ as for the curves 1, 2, and 3 in FIG. 20. However, additionally, the curve 4$^1$ is indicated in FIG. 24, showing the pulses applied from the second AND-member 341$^1$ to the magnetic coil 816. If, for example, as described above, a pulse 343 is applied at the time control element Z and a further pulse 344 is applied from the scanner 211, the AND-member 341 transmits from its output $x$ a pulse 345 to the amplifier 342. At this instant, the antivalent output $y$ of the AND-member 341 does not emit any signal, so that the second AND-member 341 has only applied thereto an input of the time control element Z. Therefore, no output pulse appears at the output $x$. For the pulse 346 coming from the scanner 211, the same holds true as has been described above in connection with FIG. 20. If the time control element transmits a pulse 352 according to curve 1$^1$, and at the same time the scanner 211 does not emit a pulse, two pulses are applied simultaneously at the second AND-member 341$^1$, from the time control element Z, as well as from the antivalent output $y$ of the first AND-member 341. The second AND-member 341$^1$ applies the pulse 353, via its output $x$, to the amplifier 342$^1$. In FIGS. 21 and 24, the grounding of the coil 158 or 816, respectively, is designated by 354. This ground connection can be accomplished, for example, by a center tap. In this circuit, there is always effective an electromagnetic force in the selecting zone, when a control element 801 passes thereover. In place of a centrally arranged coil 816, it is also possible to use two coils, each assigned to one of the permanent magnets 814$^1$ and 815$^1$ and influencing the magnetic fields thereof.

Similarly to the embodiment of FIG. 22, the control elements 801 can be retained in their selected position by a locking device 690 provided with clamping strips 691.

This locking in position can also be attained by selecting appropriate magnetic field strengths, or by other means which will be mentioned below.

A somewhat modified embodiment of the above-disclosed control head K is shown in FIGS. 25–27; this embodiment is particularly suitable for the transmission of rather large mechanical forces from the control elements 801 to the transverse control needles 703. Here, a mechanical holding strip 861 is provided in the zone of the control element rod 860, this strip partaking in the reciprocating motion of the setting member 811 along the row 860 of control elements pertaining thereto. The holding strip 861 is provided, in the central region of the setting member 811, with an interruption, so that the selection and displacement of the control elements 801 can take place at this point. In the region of the rear ends of the control elements 801, where the control lugs 802 have already assumed their stop position, the holding strip 861 then engages behind the free narrow side of the control lugs 802, so that the latter are held flush between the abutment strips 862 and 863, on the one hand, and the holding strip 861, on the other hand (see particularly FIG. 27). The abutment strips 862, 863 do not have to be magnetic strips, although this would be advantageous for the transitional movement from the guide tracks 812 and 813 to the abutment surfaces. Upon the reciprocating movement of the setting member 811, the control elements 801 are brought, with quick succession, into a position 801 or 801$^1$ corresponding to the pattern (see FIG. 23).

It should be noted that a device as the one described above can be used not only for the control of sinkers 704 or the like, but also satisfactorily for the production of punched cards.

In FIGS. 28, 29 and 30, special constructions of the connecting system between the control box St and the jacquard portion 601 or 701 are illustrated. These further developments of the invention are suitable if stronger mechanical forces must be expended for moving the transverse needles 703 than can be provided for example, with certainty by the magnetic strips 804, 805. FIG. 28 shows the beveled end 851 on the side of the transverse needles of a control element 801, effective in the direction of arrow 9 upon a special coupling member 852 and lifting this coupling member from the low position, shown in bold lines, into the engaging position 852b, shown in dashed lines. The coupling member 852 is connected, via a pin 853, the the control box St. This pin 853 is positioned at about the point of the line of force for actuating the transverse control needle 703. The control element 801 therefore need only lift, with its end 851, the coupling member 852 into the engagement position 852b. The magnetic flux extends, via the coupling member 853, substantially directly from the control box St to the transverse needle 703.

FIG. 29 shows an embodiment which is somewhat modified as compared to FIG. 28. In this figure, a bell crank 856, having an axis of rotation 859, serves as the coupling member between the transverse control needle 703 and the end 855 on the side of the transverse needle of a control element 801. It can be seen how the end 855 of the control element 801 is positioned outside of the range of the toggle lever 856, in the right abutment position shown in bold lines, whereas the end 855, in the left abutment position (shown in dashed lines), engages underneath the arm of the toggle lever 856. In this connection, the drive movement of the control box St, in accordance with the arrow Pf6, is at right angles to the direction of travel of the control elements 801. This feature makes not only possible a speed ratio between the movements of the control box and the transverse needle, but the control elements 801 are also retained in their position by additional frictional forces, on account of the loads extending at right angles to their direction of displacement. FIG. 30 is a partial plan view of the arrangement of FIG. 29, along the line of sight C.

From FIG. 31, it can be seen that an adjusting member 811 can also be employed for controlling radially and parallelly arranged control elements 871, provided on a circular disk 872. In this embodiment, the circular disk 872 belonging to the pattern wheel 870 is rotatably mounted at 873, whereas the setting member 811 is mounted in a stationary manner. The mode of operation of pattern wheels 870 in circular knitting machines is conventional. In accord with U.S. Patent No. 2,990,792, control elements 871 correspond to the conventional jacks and parts 890 to the needle-actuating shoulders of the jacks. Reference numerals 881 and 882 in FIG. 31 are the abutment surfaces for the control lugs 802 which can be made magnetic, for example, by circular magnets 885, indicated in dashed lines.

A substantial advantage of the invention resides in that the selective movement of a control element 111, 421, 621, 801 can be of a very short distance, and its masses can be kept very small. Therefore, the selective movement can be adjusted more satisfactorily to the frequency of rapid control pulses as is obtainable, for example, by the electro-optical scanning of a pattern 203, 503. The term "rapid frequency" is to mean in this connection in the present application those frequencies ranging above approximately 500 cycles per second. The mechanical movement of the knitting needles 110, transverse needles 603, 703, or like relatively inert parts, can be conducted comparatively slowly after the selective movement has been executed, for the mechanical motion trails the selective motion, and a longer period of time is available therefor.

In cooperation with the scanning device, it is possible to scan, via electro-optical scanners 211 a pattern 299, 503 which is not rastered, if desired, and thus directly control a textile machine by means of the control device of this invention. A possibility of optically comparing the pattern and the just-manufactured product is maintained. Therefore, corrections on the first samples of the product can easily be carried out. This is also advantageous when the control device, or the textile machine controlled thereby, runs compartively slowly, for example for the production of a product sample.

The embodiment shown particularly in FIGS. 23–27, provided with an adjusting member having converging and diverging guide tracks 812, 813 has the following additional, substantial advantages:

A starting and a terminal path of the setting member is avoided; the control head K can be arrested at any desired selected point, for a short period of time. Subsequent thereto, the motion of the control head can be reversed, or a new program control can be initiated. If desired, a position of the control elements selected by the setting members can be retained by advancing the control head without employing any current. This means that identical weaving rows or knitting rows can be joined to one another without having to selectively control the control elements 801 upon each shifting motion of the control head. This is advantageous in case of woven pieces having a pattern at the binding, at the binding, at the edge, and in the form of stripes. The above-mentioned reversal of the control head at any desired point is advantageous, if it is desired to produce a textile product having a predetermined contour, for example having the contour of a dress pattern. The reversal can be conducted in any desired manner, for example, electronically or electrically or by electro-optical scanning. An electro-optical scanner can, for example, scan the contour of a cutout for a dress and give the respective reversal pulses at any desired point along a row of needles.

The setting member 811 can also serve for controlling the straight and circular knitting machines mentioned in the introduction; in such a case, the individual control elements 801 take care of the actuation of coupling members 111, or of the engagement of drive rods 106 into an entrainment position for the drive rods and/or the needles 110.

It should be understood, of course, that the foregoing disclosure relates to only preferred embodiments of the invention and that is intended to cover all changes and modifications of the examples of the invention herein chosen for the purposes of the disclosure, which do not constitute departure from the spirit and scope of the invention set forth in the appended claims.

What is claimed is:

1. In combination with a loom, a device for selectively lifting the warp threads thereof, comprising a plurality of control elements (801) arranged side by side, equilibrium means (804, 805; 861, 862, 863) giving the control elements two separated equilibrium positions, magnetic setting means (811) to move past the control elements, to push the control elements one after the other away from their equilibrium positions into a central position between the equilibrium positions while maintaining them magnetically biased toward the equilibrium position from which they were pushed, to select the control elements when in central position electromagnetically to be biased magnetically toward one of the equilibrium positions, and thence to pull the control elements into the equilibrium positions toward which they were biased by the electromagnetic selection, and means (St., 705, 706, 764, 711, 703, 704, 714), operable upon selection of the control elements, to lift warp threads as a function of the equilibrium positions occupied by the control elements.

2. A device as claimed in claim 1, the magnetic setting means comprising two mutually facing constant-field magnets (818, 819, 814$^1$, 812; 818, 819, 815$^1$, 813), the constant-field magnets mutually converging to a point of closest approach and then diverging, the control elements having magnetizable control lugs (802), the pushing of the control elements being on the magnetizable control lugs by the mutually converging parts of the constant-field magnets, the pulling of the control elements being on the magnetizable control lugs by the mutually diverging parts of the constant-field magnets, the control elements being in central position when their magnetizable control lugs are at the point of closest approach of the constant-field magnets.

3. A device as claimed in claim 2, the magnetic setting means (811) including electromagnet means (816, 817, 818) to control the direction of force on the magnetizable control lugs at the point of closest approach between the constant-field magnets.

4. A device as claimed in claim 3, the magnetizable control lugs substantially filling the distance between the constant-field magnets at their point of closest approach.

5. A device as claimed in claim 1, the equilibrium means comprising two spaced magnetic rails (804, 805).

6. A device as claimed in claim 2, the constant-field magnets being of substantially equal strength.

7. A device as claimed in claim 1, the equilibrium means comprising two spaced abutment strips (862, 863) and mechanical holding strips (861) situated centrally between the abutment strips, the mechanical holding strips connected to the magnetic setting means for movement therewith and situated outside of the magnetic setting means.

8. A device as claimed in claim 3, the mutually converging and diverging parts of the constant-field magnets comprising a pole (818) of one sign and a pole (819) of the opposite sign, the poles (818) and (819) being separated, one (818) of the poles of each constant-field magnet being interconnected by a yoke (817), a coil (816) wound around the yoke, the yoke and the two poles (818) comprising the electromagnet means, whereby the direction of force on the magnetizable control lugs at the point of closest approach between the constant-field magnets is controlled as a function of current direction in the coil.

9. A device as claimed in claim 3, the electromagnetic means capable of creating a magnetic field at the point of closest approach, and comprising means (FIG. 24) to vary its magnetic field as a function of its position relative to the control elements.

10. A device as claimed in claim 1, the control elements being held in their equilibrium positions by forces of predetermined magnitude, further comprising means (851, 852, 853; 855, 856, 859) whereby the control elements may transmit forces greater than said forces of predetermined magnitude and yet remain in their equilibrium positions.

11. A device as claimed in claim 1, the means to lift comprising a control box (St), the control elements (801) mounted slidably in the control box, the control elements protruding from the control box farther in one equilibrium position than in the other equilibrium position, a needle board (705, 706), transverse needles (703) mounted slidably in the needle board, the transverse needles aligned with the assigned to the control elements, blade box (711), and means (763, 764, 765, St) whereby movement of the blade box transverse to the transverse needles moves those transverse needles aligned with control elements in the position of farther protrusion through a displacement by sliding in their mountings in the needle board.

12. A device as claimed in claim 11, the control elements being held in their equilibrium positions by forces of predetermined magnitude, the means to lift further comprising means (851, 852, 853; 855, 856, 859) whereby the control elements may transmit forces greater than said forces of predetermined magnitude and yet remain in their equilibrium positions.

13. A device as claimed in claim 1, the control elements being elongated and having their directions of elongation parallel, the equilibrium means including means (844) to mount the control elements, the control elements being slidable in the means (844) in their directions of elongation between the two equilibrium positions, the equilibrium means including two magnetic rails (804, 805) fixed in position relative to the means (844), the magnetic rails extending in parallel perpendicularly to the direction of elongation of the control elements and mutually spaced, each control element having a magnetizable stop lug (803) protruding perpendicularly from its direction of elongation to between the magnetic rails, the two equilibrium positions being the positions of the control elements wherein the control lugs are adhering to the magnetic rails, the magnetic setting means (811) comprising supporting arm means (829) to provide a mount movable parallel to the magnetic rails, the magnetic setting means further comprising two constant-field magnets (818, 819, 814, 812; 818, 819, 815$^1$, 813) extending substantially parallel to the magnetic rails and mutually spaced, the constant-field magnets mounted to the means (829) for movement therewith, the control elements each having a magnetizable control lug (802) extending perpendicularly from its direction of elongation the constant-field magnets mutually converging to a point of closest approach and then mutually diverging, movement of the means (829) bringing first the converging part of one of the constant-field magnets against the control lugs successively, whereby the control lugs ride under magnetic adhesive to the point of closest approach, the magnetic setting means further including a variable-field magnet means mounted on the means (829) and actuatable to make the magnetic attraction at the nets, point of closest approach predominate toward one of the two constant-field magnets, whereby the control lug may be selected onto one of the two constant field magnets, the control lugs riding, upon further movement of the means (829), under magnetic adherence on the diverging part of their selected constant-field magnets, whereby the stop lugs (803) are brought into contact with one of the magnetic rails.

14. A device as claimed in claim 1, the control elements being elongated and having their directions of elongation parallel, the equilibrium means including means (844) to mount the control elements, the control elements being slidable in the means (844) in their directions of elongation between the two equilibrium positions, the equilibrium means including two abutment strips (862, 863) fixed in position relative to the means (844), the abutment strips extending in parallel perpendicularly to the directions of elongation of the control elements and mutually spaced, each control element having a magnetizable control lug (802) protruding perpendicularly from its direction of elongation to between the abutment strips, the two equilibrium positions being the positions of the control elements wherein the control lugs are touching the abutment strips, the magnetic setting means (811) comprising a supporting arm means (829) to provide a mount movable parallel to the abutment strips, the magnetic setting means further comprising two constant-field magnets (818, 819, 814$^1$, 812; 818, 819, 915$^1$, 813) extending substantially parallel to the abutment strips and mutually spaced, the constant-field magnets mounted to the means (829) for movement therewith, the constant-field magnets mutually converging to a point of closest approach and then mutually diverging, movement of the means (829) bringing first the converging part of one of the constant-field magnets against the control lugs successively, whereby the control lugs ride under magnetic adherence to the point of closest approach, the magnetic setting means further including a variable-field magnet means mounted on the means (829) and actuatable to make the magnetic attraction at the point of closest approach predominate toward one of the two constant-field magnets, whereby the control lugs may be selected onto one of the two constant field magnets, the control lugs riding, upon further movement of the means (829), under magnetic adherence on the diverging part of their selected constant-field magnets, whereby the control lugs are brought into contact with one of the abutment strips, the equilibrium means further including mechanical holding strips mounted to the means (829) for movement therewith, the holding strips extending parallel to the abutment strips and situated centrally between them, the holding strips holding the control lugs against the abutment strips, the holding strips having pointed ends pointing toward the point of closest approach, the pointed ends approaching the point of closest approach only to the point at which the separation between the constant-field magnets equals the separation between the abutment strips.

15. A device as claimed in claim 1, the magnetic setting means (811) being operable to select control elements in either direction of reciprocating movement past the control elements.

References Cited

UNITED STATES PATENTS

| | | | |
|---|---|---|---|
| 3,262,285 | 7/1966 | Begvin et al. | 66—154 XR |
| 3,283,541 | 11/1966 | Decerjat | 66—154 XR |
| 3,365,917 | 7/1968 | Schmidt et al. | 66—50 |
| 2,020,429 | 11/1935 | Nakanishl | 139—319 |
| 2,058,095 | 10/1936 | Nakanishl | 139—319 |
| 2,845,096 | 7/1958 | Pasquet | 139—319 |
| 3,035,426 | 5/1962 | Macqueen | 66—154 XR |
| 3,079,775 | 3/1963 | Schaeder | 66—156 |
| 3,117,598 | 1/1964 | Burkhalter | 139—319 |
| 3,247,815 | 4/1966 | Polevitzky | 139—319 XR |
| 3,265,096 | 8/1966 | Zangerle et al. | 139—59 |
| 3,170,312 | 2/1963 | Stock | 66—50 |
| 3,292,393 | 12/1966 | Ribler | 66—154 |
| 3,365,916 | 1/1968 | Ribler et al. | 66—154 |

FOREIGN PATENTS 883,432  11/1961  Great Britain.

RONALD FELDBAUM, Primary Examiner

U.S. Cl. X.R.

66—154